(12) United States Patent
Davis et al.

(10) Patent No.: US 11,275,503 B2
(45) Date of Patent: Mar. 15, 2022

(54) CONTROLLING ACCESS TO PREVIOUSLY-STORED LOGIC IN A RECONFIGURABLE LOGIC DEVICE

(71) Applicant: Amazon Technologies, Inc., Seattle, WA (US)

(72) Inventors: Mark Bradley Davis, Austin, TX (US); Erez Izenberg, Tel Aviv (IL); Robert Michael Johnson, Austin, TX (US); Asif Khan, Austin, TX (US); Islam Mohamed Hatem Abdulfattah Mohamed Atta, Vancouver (CA); Nafea Bshara, San Jose, CA (US); Christopher Joseph Pettey, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/863,700

(22) Filed: Apr. 30, 2020

(65) Prior Publication Data
US 2020/0257454 A1 Aug. 13, 2020

Related U.S. Application Data

(62) Division of application No. 15/282,148, filed on Sep. 30, 2016, now Pat. No. 10,642,492.

(51) Int. Cl.
*G06F 3/06* (2006.01)
*G06F 12/08* (2016.01)
(Continued)

(52) U.S. Cl.
CPC .......... *G06F 3/0607* (2013.01); *G06F 3/0635* (2013.01); *G06F 3/0644* (2013.01);
(Continued)

(58) Field of Classification Search
CPC .......................... G06F 3/0652; G06F 12/0891
See application file for complete search history.

(56) References Cited

U.S. PATENT DOCUMENTS

| 5,887,165 A | 3/1999 | Martel et al. |
| 6,011,407 A | 1/2000 | New |

(Continued)

FOREIGN PATENT DOCUMENTS

| JP | H10232890 A | 9/1998 |
| JP | 2000-10770 | 1/2000 |

(Continued)

OTHER PUBLICATIONS

Byma et al., "FPGAs in the Cloud: Booting Virtualized Hardware Accelerators with OpenStack," 2014 IEEE 22nd Annual International Symposium on Field-Programmable Custom Computing Machines, May 2014, pp. 109-116.

(Continued)

*Primary Examiner* — David E Martinez
(74) *Attorney, Agent, or Firm* — Klarquist Sparkman, LLP

(57) ABSTRACT

Methods and apparatus are disclosed for securely erasing partitions of reconfigurable logic devices such as FPGAs in a multi-tenant server environment. In one example, a method of securely erasing an FPGA includes identifying one partition of previously-programmed resources in the FPGA, erasing the identified partition by storing new values in memory or storage elements of the identified partition, and storing new values in memory or storage elements of additional external resources electrically connected to the integrated circuit and associated with the identified partition. Thus, other partitions and subsequent users of the identified partition are prevented from accessing the securely erased data. A configuration circuit, accessible by a host computer (Continued)

via DMA, can be programmed into the FPGA reconfigurable logic for performing the disclosed erasing operations.

14 Claims, 9 Drawing Sheets

(51) Int. Cl.
*G06F 15/78* (2006.01)
*G06F 21/51* (2013.01)
*G06F 13/28* (2006.01)
*G11C 7/10* (2006.01)

(52) U.S. Cl.
CPC ............ *G06F 3/0685* (2013.01); *G06F 13/28* (2013.01); *G06F 15/7871* (2013.01); *G06F 21/51* (2013.01); *G11C 7/1072* (2013.01); *G06F 2221/2143* (2013.01)

(56) References Cited

U.S. PATENT DOCUMENTS

| | | | |
|---|---|---|---|
| 6,034,542 A | 3/2000 | Ridgeway | |
| 6,438,737 B1 | 8/2002 | Morelli et al. | |
| 6,476,634 B1 | 11/2002 | Bilski | |
| 6,539,438 B1 | 3/2003 | Ledzius et al. | |
| 6,595,921 B1 | 7/2003 | Urbano et al. | |
| 6,678,646 B1 | 1/2004 | McConnell et al. | |
| 6,693,452 B1 | 2/2004 | Ansari et al. | |
| 6,785,816 B1 | 8/2004 | Kivimaki et al. | |
| 6,802,026 B1 | 10/2004 | Patterson | |
| 6,826,717 B1 | 11/2004 | Draper et al. | |
| 7,117,481 B1 | 10/2006 | Agesen et al. | |
| 7,177,961 B2 | 2/2007 | Brice, Jr. et al. | |
| 7,243,221 B1 | 7/2007 | Ryser | |
| 7,281,082 B1 | 10/2007 | Knapp | |
| 7,313,794 B1 | 12/2007 | Ansari | |
| 7,404,023 B1 | 7/2008 | Kaszynski | |
| 7,451,426 B2 | 11/2008 | Pribbernow | |
| 7,564,727 B1 | 7/2009 | Huang | |
| 7,581,117 B1 | 8/2009 | Irving et al. | |
| 7,678,048 B1 | 3/2010 | Urbano et al. | |
| 7,706,417 B1 | 4/2010 | Rhodes | |
| 7,716,497 B1 | 5/2010 | Timberger | |
| 7,721,036 B2 | 5/2010 | Poplack et al. | |
| 7,734,859 B2 | 6/2010 | Daniel et al. | |
| 7,739,092 B1 | 6/2010 | Ballagh et al. | |
| 7,902,866 B1 | 3/2011 | Patterson | |
| 7,904,629 B2 | 3/2011 | Daniel | |
| 7,962,582 B2 | 6/2011 | Potti et al. | |
| 8,058,899 B2 | 11/2011 | Vorbach et al. | |
| 8,145,894 B1 | 3/2012 | Casselman | |
| 8,219,989 B2 | 7/2012 | Armstrong et al. | |
| 8,390,321 B2 | 3/2013 | Nakaya | |
| 8,516,272 B2 | 8/2013 | Hofstee et al. | |
| 8,533,428 B2 | 9/2013 | Bennett et al. | |
| 8,561,065 B2 | 10/2013 | Cunningham et al. | |
| 8,621,597 B1 | 12/2013 | Jenkins, IV | |
| 8,626,970 B2 | 1/2014 | Craddock et al. | |
| 8,645,712 B1 | 2/2014 | Langhammer | |
| 8,686,549 B2 | 4/2014 | Vorbach | |
| 8,726,337 B1 | 5/2014 | Curry et al. | |
| 8,745,561 B1 | 6/2014 | Garg et al. | |
| 8,776,090 B2 | 7/2014 | Elzur | |
| 8,799,992 B2 | 8/2014 | Marvais et al. | |
| 8,881,141 B2 | 11/2014 | Koch et al. | |
| 8,914,590 B2 | 12/2014 | Vorbach et al. | |
| 8,928,351 B1 | 1/2015 | Konduru | |
| 9,009,707 B2 | 4/2015 | Chandrakar et al. | |
| 9,038,072 B2 | 5/2015 | Nollet et al. | |
| 9,064,058 B2 | 6/2015 | Daniel | |
| 9,098,662 B1 | 8/2015 | Chin et al. | |
| 9,104,453 B2 | 8/2015 | Anand et al. | |
| 9,141,747 B1 | 9/2015 | Orthner | |
| 9,218,195 B2 | 12/2015 | Anderson et al. | |
| 9,298,865 B1 | 3/2016 | Peng | |
| 9,361,416 B2 | 6/2016 | Fine et al. | |
| 9,372,956 B1 | 6/2016 | Fan et al. | |
| 9,396,012 B2 | 7/2016 | Plondke et al. | |
| 9,483,639 B2 | 11/2016 | Sliwa et al. | |
| 9,503,093 B2 | 11/2016 | Karras et al. | |
| 9,590,635 B1 | 3/2017 | Sengupta | |
| 9,619,292 B2 | 4/2017 | Kodialam et al. | |
| 9,684,743 B2 | 6/2017 | Larzul | |
| 9,703,703 B2 | 7/2017 | LeMay et al. | |
| 9,747,185 B2 | 8/2017 | Fine | |
| 9,841,993 B2 | 12/2017 | Mine et al. | |
| 9,916,175 B2 | 3/2018 | Beckwith et al. | |
| 9,983,938 B2 | 5/2018 | Heil et al. | |
| 10,027,543 B2 | 7/2018 | Lanka et al. | |
| 10,037,222 B2 | 7/2018 | Bolic et al. | |
| 10,069,681 B2 | 9/2018 | Izenberg et al. | |
| 10,140,639 B2 | 11/2018 | Kruglick | |
| 10,169,065 B1 | 1/2019 | Nye et al. | |
| 10,223,014 B1 | 3/2019 | Atsatt et al. | |
| 10,223,317 B2 | 3/2019 | Atta et al. | |
| 10,275,288 B2 | 4/2019 | Pinto et al. | |
| 10,338,135 B2 | 7/2019 | Davis et al. | |
| 10,461,937 B1 | 10/2019 | Allen | |
| 10,642,492 B2 | 5/2020 | Davis et al. | |
| 10,705,995 B2 | 7/2020 | Khan et al. | |
| 10,747,565 B2 | 8/2020 | Johnson et al. | |
| 10,778,653 B2 | 9/2020 | Atta et al. | |
| 2002/0199110 A1 | 12/2002 | Kean | |
| 2004/0113655 A1 | 7/2004 | Curd et al. | |
| 2004/0236556 A1 | 11/2004 | Lin | |
| 2005/0081199 A1 | 4/2005 | Traut | |
| 2005/0198235 A1 | 9/2005 | Kumar et al. | |
| 2008/0013569 A1 | 1/2008 | Boren | |
| 2008/0028186 A1 | 1/2008 | Casselman | |
| 2008/0051075 A1 | 2/2008 | Einloth et al. | |
| 2010/0161870 A1 | 6/2010 | Daniel | |
| 2010/0174865 A1* | 7/2010 | Koester | G06F 21/80 711/114 |
| 2011/0047546 A1 | 2/2011 | Kivity et al. | |
| 2012/0005473 A1 | 1/2012 | Hofstee et al. | |
| 2012/0047371 A1 | 2/2012 | Woodall | |
| 2012/0254885 A1 | 10/2012 | Cai et al. | |
| 2013/0145431 A1 | 6/2013 | Kruglick | |
| 2013/0152099 A1 | 6/2013 | Bass et al. | |
| 2013/0198459 A1* | 8/2013 | Joshi | G06F 12/0891 711/130 |
| 2013/0205295 A1 | 8/2013 | Ebcioglu et al. | |
| 2013/0318240 A1 | 11/2013 | Hebert et al. | |
| 2014/0215424 A1 | 7/2014 | Fine et al. | |
| 2014/0297405 A1 | 10/2014 | Fine | |
| 2014/0351811 A1 | 11/2014 | Kruglick | |
| 2014/0380025 A1 | 12/2014 | Kruglick | |
| 2015/0026385 A1 | 1/2015 | Egi et al. | |
| 2015/0128268 A1 | 5/2015 | Fine et al. | |
| 2015/0169376 A1 | 6/2015 | Chang et al. | |
| 2015/0227662 A1 | 8/2015 | Lepereq | |
| 2016/0034295 A1 | 2/2016 | Cochran | |
| 2016/0094413 A1 | 3/2016 | Jain | |
| 2016/0111168 A1 | 4/2016 | Cline et al. | |
| 2016/0210167 A1 | 7/2016 | Bolic et al. | |
| 2016/0239906 A1 | 8/2016 | Kruglick | |
| 2016/0285628 A1 | 9/2016 | Carrer et al. | |
| 2016/0301742 A1 | 10/2016 | Lowery | |
| 2016/0321081 A1 | 11/2016 | Kim et al. | |
| 2016/0371021 A1 | 12/2016 | Goldberg et al. | |
| 2017/0090992 A1 | 3/2017 | Bivens et al. | |
| 2017/0153854 A1 | 6/2017 | Zheng | |
| 2017/0187831 A1 | 6/2017 | Otting et al. | |
| 2017/0213053 A1 | 7/2017 | Areno et al. | |
| 2017/0264680 A1 | 9/2017 | Palermo et al. | |
| 2018/0027067 A1 | 1/2018 | Guim Bernat et al. | |
| 2018/0034793 A1 | 2/2018 | Kibalo et al. | |
| 2018/0075231 A1 | 3/2018 | Subramanian et al. | |
| 2018/0077144 A1 | 3/2018 | Gangawane et al. | |
| 2018/0082083 A1 | 3/2018 | Smith et al. | |
| 2018/0088174 A1 | 3/2018 | Davis et al. | |
| 2018/0088992 A1 | 3/2018 | Davis et al. | |
| 2018/0089119 A1 | 3/2018 | Khan et al. | |

(56) References Cited

U.S. PATENT DOCUMENTS

| | | | |
|---|---|---|---|
| 2018/0089343 A1 | 3/2018 | Atta | |
| 2018/0091484 A1 | 3/2018 | Atta et al. | |
| 2018/0095670 A1 | 4/2018 | Davis et al. | |
| 2018/0095774 A1 | 4/2018 | Atta et al. | |
| 2018/0139110 A1 | 5/2018 | Johnson et al. | |
| 2018/0165455 A1* | 6/2018 | Liguori | G06F 9/4416 |
| 2018/0302281 A1 | 10/2018 | Khan et al. | |
| 2019/0036713 A1 | 1/2019 | Slik | |
| 2019/0065757 A1 | 2/2019 | Graf et al. | |
| 2020/0167506 A1 | 5/2020 | Iyer et al. | |
| 2020/0228388 A1 | 7/2020 | Schulz et al. | |
| 2020/0412701 A1 | 12/2020 | Atta et al. | |
| 2021/0012035 A1 | 1/2021 | Wei et al. | |
| 2021/0111863 A1 | 4/2021 | Trivedi et al. | |
| 2021/0117246 A1 | 4/2021 | Lal et al. | |
| 2021/0117556 A1 | 4/2021 | Graf et al. | |

FOREIGN PATENT DOCUMENTS

| | | |
|---|---|---|
| JP | 2002-530780 | 9/2002 |
| JP | 2002-366597 | 12/2002 |
| JP | 2005-107911 A | 4/2005 |
| JP | 2005-536726 | 12/2005 |
| JP | 2007-243671 | 9/2007 |
| JP | 2008-516310 A | 5/2008 |
| JP | 2008-523727 A | 7/2008 |
| JP | 2009-159365 | 7/2009 |
| JP | 2010-117968 | 5/2010 |
| JP | 2013045219 A | 8/2011 |
| JP | 2014-500644 A | 1/2014 |
| JP | 2014-525709 A | 9/2014 |
| JP | 2014178784 A | 9/2014 |
| JP | 2014230174 A | 12/2014 |
| JP | 2015-507234 A | 3/2015 |
| JP | 2019-530099 | 10/2019 |
| JP | 2019-534618 | 11/2019 |
| JP | 2019-535092 | 12/2019 |
| JP | 2019-537099 | 12/2019 |
| JP | 2020-64678 | 4/2020 |
| WO | WO 02/01425 | 1/2002 |
| WO | WO 2004/075056 | 9/2004 |
| WO | WO 2010/100871 | 9/2010 |
| WO | WO 2013/158707 | 10/2013 |
| WO | WO 2015/042684 | 4/2015 |
| WO | WO 2016/100979 | 6/2016 |

OTHER PUBLICATIONS

"SDAccel Development Environment User Guide," Xilinx, Inc., © 2016, 85 pages.

"The Xilinx SDAccel Development Environment Bringing The Best Performance/Watt to the Data Center," Xilinx, Inc., © 2014, 6 pages.

Chen et al., "Enabling FPGAs in the Cloud," Proceedings of the 11th ACM Conference on Computing Frontiers, May 2014, pp. 1-10.

Eguro et al., "FPGAs for trusted cloud computing," 2012 22nd International Conference on Field Programmable Logic and Applications, Aug. 2012, pp. 63-70.

Eslami et al., "Enabling Effective FPGA Debug Using Overlays: Opportunities and Challenges," 2nd International Workshop on Overlay Architectures for FPGAs, Jun. 2016, pp. 1-6.

Fahmy et al., "Virtualized FPGA Accelerators for Efficient Cloud Computing," 2015 IEEE 7th International Conference on Cloud Computing Technology and Science, 2015, pp. 430-435.

Hutchings et al., "Implementation Approaches for Reconfigurable Logic Application," Proceedings of the 5th International Workshop on Field Programmable Logic and Applications, Aug.-Sep. 1995, pp. 419-428.

International Search Report and Written Opinion for PCT/US2017/054180, dated Jan. 16, 2018, 11 pages.

"SDAccel Development Environment," Xilinx, Inc., document downloaded from http://www.xilinx.com/products/design-tools/software-zone/sdaccel.html on Jul. 25, 2016, 9 pages.

Weerasinghe et al., "Enabling FPGAs in Hyperscale Data Centers," 2015 IEEE 12th International Conference on Ubiquitous Intelligence and Computing, 2015 IEEE 12th International Conference on Autonomic and Trusted Computing, and 2015 IEEE 15th Conference on Scalable Computing and Communications and ITS Associated Workshops, Aug. 2015, pp. 1078-1086.

Xilinx, "7 Series FPGAs Overview" (Year: 2011).

Zazo et al., "A PCIe DMA engine to support the virtualization of 40 Gbps FPGA-accelerated network appliances," 2015 IEEE International Conference on Reconfigurable Computing and FPGAS, Dec. 2015, pp. 1-6.

Hori et al., "Bitsteam encryption and authentication with AES-GCM in dynamically reconfigurable systems," The Institute of Electronics, Information and Communication Engineers, May 2008, pp. 13-18.

Knodel et al., "Computing Framework for Dynamic Integration of Reconfigurable Resources in a Cloud," 2015 Euromicro Conference on Digital System Design, Aug. 2015, pp. 337-344.

Heiner et al., "FPGA Partial Reconfiguration Via Configuration Scrubbing," 2009 International Conference on Field Programmable Logic and Applications, Aug. 2009, pp. 99-104.

Heiner et al., "Fault Tolerant ICAP Controller for High-Reliable Internal Scrubbing," 2008 IEEE Aerospace Conference, Mar. 2008, pp. 1-10.

\* cited by examiner

CONTROLLING ACCESS TO PREVIOUSLY-STORED LOGIC IN A RECONFIGURABLE LOGIC DEVICE

CROSS REFERENCE TO RELATED APPLICATIONS

This is a Division of U.S. patent application Ser. No. 15/282,148, filed Sep. 30, 2016, which is hereby incorporated by reference.

BACKGROUND

Cloud computing is the use of computing resources (hardware and software) which are available in a remote location and accessible over a network, such as the Internet. In some arrangements, users are able to buy these computing resources (including storage and computing power) as a utility on demand service. Cloud computing entrusts remote services with a user's data, software and computation. Use of virtual computing resources can provide a number of advantages including cost advantages and/or the ability to adapt rapidly to changing computing resource needs.

Some computations can be accelerated through the use of a co-processor, including accelerators implemented with reconfigurable logic (e.g., in a Field Programmable Gate Array (FPGA). FPGA developers typically connect a local host computer with a specialized interface to external pins of a local FPGA supporting a JTAG interface in order to accelerate functions mapped to the FPGA. Thus, using such accelerators in a cloud computing environment, which typically lacks FPGA-specialized hardware and security features, presents ample opportunity for improvement.

DETAILED DESCRIPTION

Figure 1:
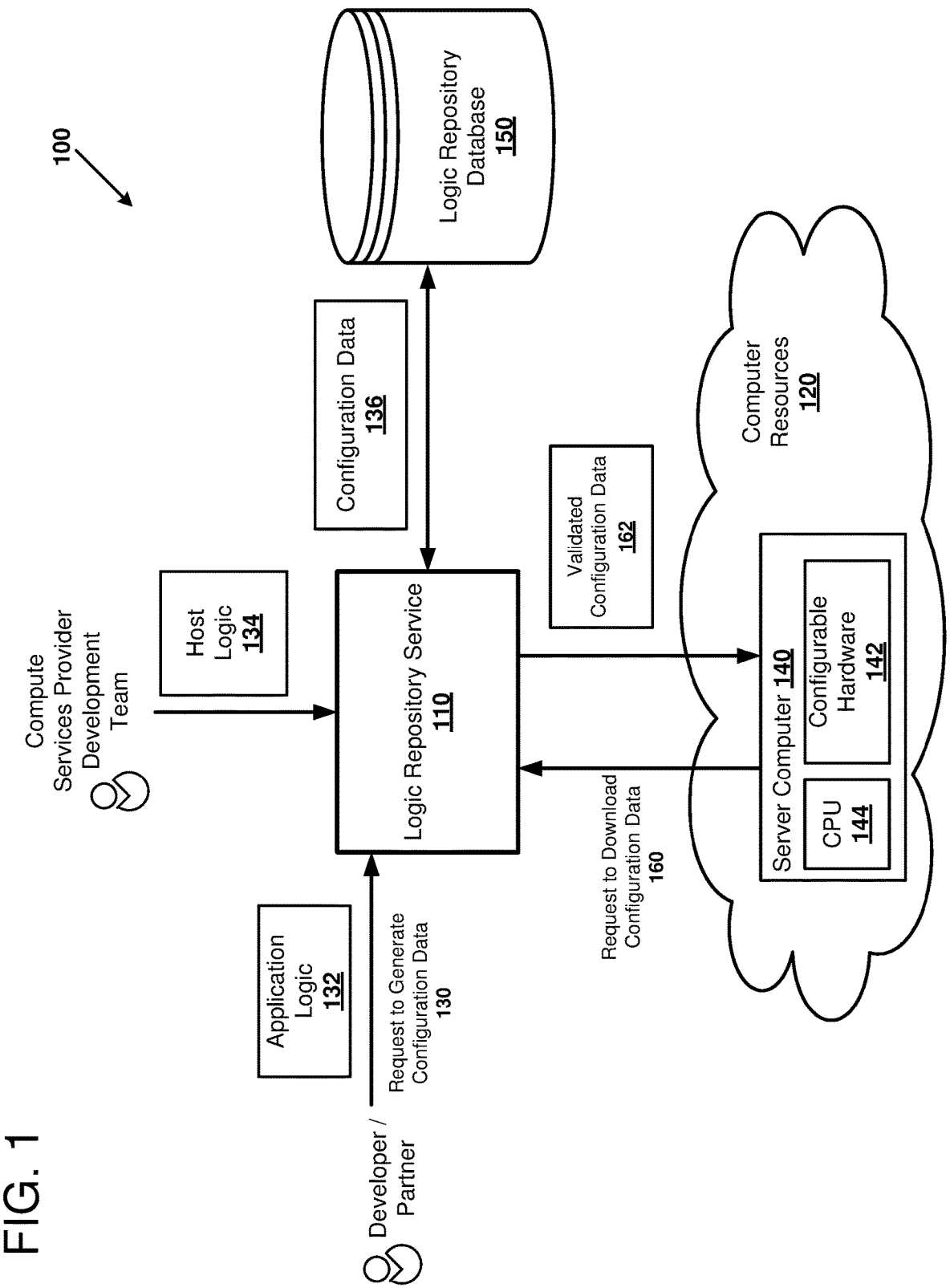
FIG. 1 is a system diagram showing an example of a system including a logic repository service for managing configuration data and programming reconfigurable logic devices, as can be implemented in certain examples of the disclosed technology.

One solution for providing specialized computing resources within a set of reusable general computing resources is to provide a server computer comprising a configurable logic platform (such as by providing a server computer with an add-in card including a reconfigurable logic device, such as a field-programmable gate array (FPGA)) as a choice among the general computing resources. Configurable logic is hardware that can be programmed or configured to perform a logic function specified by application of configuration data. For example, a user of the computing resources can provide a specification (e.g., written in a hardware description language (e.g., Verilog, SystemVerilog, and/or VHDL) or other language (e.g., C, C++, and/or SystemC), in a netlist generated with a schematic capture application, or in a netlist generated by a script) for configuring the configurable logic. The configurable logic can be configured according to the specification, and the configured logic can be used to perform a task for the user. However, allowing a user access to low-level hardware of the computing facility can potentially introduce security and privacy issues within the computing facility. For example, as the reconfigurable logic devices and associated components (e.g., memory and other circuits coupled to the reconfigurable logic devices) will typically be used by many users in a cloud environment, data stored in the devices and associated components should not be readable to subsequent users of the resources within the computing facility.

Issues that arise in allowing user access to low level hardware, including reconfigurable hardware in a virtualized reconfigurable logic device, include the possibility that subsequent users of the same reconfigurable logic device resources may gain access to sensitive user data by examining the state of memory and storage elements both within the reconfigurable logic device, as well as additional resources such as memories that are accessible to the reconfigurable logic device. The disclosed technologies include techniques for isolating, clearing, and/or scrubbing data stored in reconfigurable logic devices and associated additional resources.

As used herein, the term "isolating" refers to configuring a portion of a reconfigurable logic device in order to logically separate a partition from other circuitry within the reconfigurable logic device. Thus, isolating makes the isolated partition inaccessible from other partitions (e.g., other user host processes) within a reconfigurable logic device, as well as from unauthorized access from other devices (e.g., other user processes on a computing host) external to the reconfigurable logic device. For example, devices can be isolated by reprogramming logic that connects the partition to other partitions within the device, by reprogramming interconnect, by asserting or de-asserting control signals controlling interface circuits such as tri-state gates, pass gates, and/or multiplexers. In some examples, the isolating configuration operations allow logic operating in other partitions within the device to continue operation as a selected partition is isolated, cleared, and scrubbed.

As used herein, "clearing" refers to resetting values stored in memory and/or storage elements through the use of a reset functionality provided by hardware resources of the reconfigurable logic device. An example of clearing is applying a configuration bitstream to a configuration port of an FPGA, where the configuration bitstream causes the FGPA to become configured in a reset or other known state that prevents access to previously stored data in the memory and/or storage elements. In some examples, the configuration bitstream is used to reconfigure a partial portion of the reconfigurable logic in the device, while in other examples, the configuration bitstream is used to reconfigure all of the reconfigurable logic. In some examples, an FPGA includes reset functionality that can be applied by asserting signals on the I/O of the FPGA. In some examples, the acts of clearing the reconfigurable logic device can be performed by applying a specialized bitstream to the reconfigurable logic device and performing a partial reconfiguration. By performing partial reconfiguration, logic and other user partitions of the reconfigurable logic device as well as any supervisor or host partitions can maintain its programming and state. Thus, multiple users can occupy different portions of a reconfigurable logic device concurrently, and these same users can have their partition cleared and scrubbed after they have finished using the partition. In some examples, while logic in the selected partition is being cleared, logic operating in other partitions and its associated memory devices can continue to operate normally.

As used herein, the term "scrubbing" refers to performing a series of operations with a circuit to erase values stored in memory or storage of the circuit. As will be readily understood to one of ordinary skill in the relevant art, data can be erased from memory or storage elements by, for example, writing a known set of values such as all zeroes, all ones, or all of a known pattern (e.g., 0xdeadbeef), or by storing random values to replace previously stored values in the circuit. In some examples, the act of scrubbing the partition of the reconfigurable logic device can be performed by operating specialized logic configured within to the reconfigurable logic device and performing a partial reconfiguration. For example, alternate inputs of storage devices (e.g., data inputs, set/clear/reset, scan, or other suitable inputs) such as latches and flip-flops can receive the known values from the scrubber circuit to reset the stored values. In some examples, memories may provide a reset or set pin that performs the function, the scrubber circuit may iterate to perform a number of writes through multiple address of a memory, or a set of valid bits may be used in conjunction with a multiplexer on the memory output to provide either the data value stored at the memory address, or a reset value. In some examples, a port of a multiple read port memory can be used by the scrubber circuit to write known data values over previously-stored values. In some examples, while logic in the selected partition is being scrubbed, logic operating in other partitions and its associated memory devices can continue to operate normally.

Typically, other user or supervisor petitions of the reconfigurable logic device are prevented from accessing their respective partitions during isolating, but in some examples, the supervisor partitions, or the user partitions, may be configured to provide at least partial access to the partitions during these actions. By performing clearing and/or scrubbing on only a portion of the reconfigurable device and/or associated resources, user logic and memory in other user partitions of the reconfigurable logic device, as well as any supervisor or host partitions, can maintain their programming and state while an identified portion is erased. Thus, multiple users can occupy different portions of a reconfigurable logic device concurrently, and these same users can have their partition cleared and scrubbed after they have finished using the partition, for example, upon terminating the user compute host instance.

As described herein, a compute services facility can include a variety of computing resources, where one type of the computing resources can include a server computer (alternatively dubbed a host computer) comprising a configurable logic platform. The configurable logic platform can be programmed or configured by a user of the computer system so that hardware (e.g., the configurable logic) of the computing resource is customized by the user. For example, the user can program the configurable logic so that it functions as a hardware accelerator that is tightly coupled to the server computer. For example, the hardware accelerator can be accessible via a local interconnect, such as a Peripheral Component Interconnect Express (PCI-Express or PCIe) or an IEEE 802.3 (Ethernet) connection, of the server computer. The user can execute an application on the server computer and tasks of the application can be performed by the hardware accelerator using PCIe transactions. By tightly coupling the hardware accelerator to the server computer, the latency between the accelerator and the server computer can be reduced which can potentially increase the processing speed of the application.

The compute services provider can manage the computing resources using software services to manage the configuration and operation of the configurable hardware. As one example, the compute service provider can execute a logic repository service for ingesting a hardware or logic design of a user, generating validated configuration data for configuring the configurable logic platform based on the application logic generated for the user, and downloading the validated configuration data in response to a request to configure an instance of the configurable logic platform. The configuration data can include data for creating circuits for clearing and scrubbing reconfigurable logic devices and connected components after used of the computer resources is terminated. The download request can be from the user that developed the logic design or from a user that has acquired a license to use the logic design. Thus, logic designs can be created by the compute services provider, a user, or a third-party separate from the user or the compute services provider. For example, a marketplace of accelerator intellectual property (IP) can be provided to the users of the compute services provider, and the users can potentially increase the speed of their applications by selecting an accelerator from the marketplace.

FIG. 1 is a system diagram showing an example of a system 100 including a logic repository service 110 for managing configuration data that can be used to configure configurable resources within compute resources 120. In particular, the logic repository service 110 can be used for ingesting host and application logic into an infrastructure of a compute services provider, generating configuration data based on the ingested designs, maintaining a repository of the ingested designs and the generated configuration data, and providing configuration data for the configurable compute resources when the resources are deployed.

The logic repository service 110 can be a network-accessible service, such as a web service. Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. Additionally or alternatively, the web service can perform actions in response to the API request without generating a response to the endpoint identified in the request.

The logic repository service 110 can receive an API request 130 to generate configuration data for a configurable hardware platform, such as configurable hardware 142 of a server computer 140. Typically, the configurable hardware 142 includes reprogrammable logic devices, such as Field Programmable Gate Arrays (FPGAs), configurable programmable logic devices (CPLDs), programmable logic devices (PLDs), and programmable memory resources (e.g., electrically erasable programmable read only memory (EEPROM) or flash memory). In some examples, some or all of the configurable hardware is one-time programmable. In some examples, functionality for the logic repository service 110 is implemented in whole or in part using the server computer 140, while in other examples, the functionality is implemented with computer resources separate from the server computer.

The API request 130 can be originated by a developer or partner user of the compute services provider. The request 130 can include fields for specifying data and/or metadata about the logic design, the configurable hardware platform, user information, access privileges, production status, and various additional fields for describing information about the inputs, outputs, and users of the logic repository service 110. As specific examples, the request can include a description of the design, a production status (such as trial or production), an encrypted status of the input or output of the service, a reference to a location for storing an input file (such as the hardware design source code), a type of the input file, an instance type of the configurable hardware, and a reference to a location for storing an output file or report. In particular, the request can include a reference to a hardware design specifying application logic 132 for implementation on the configurable hardware platform. Host logic 134, which will be used to control operation of the application logic when programmed into the configurable hardware, is received from, for example, a compute services provider development team. A specification of the application logic 132 and/or of the host logic 134 can be a collection of files, such as source code, a netlist generated by a logic synthesis tool, and/or placed and routed logic gates generated by a place and route tool. The source code can include code written in a hardware description language (HDL), a register transfer logic (RTL) language, or a high-level language such as Open Computing Language (OpenCL) or C.

The compute resources 120 can include many different types of hardware and software categorized by instance type. In particular, an instance type specifies at least a portion of the hardware and software of a resource. For example, hardware resources can include servers with central processing units (CPUs) of varying performance levels (e.g., different clock speeds, architectures, cache sizes, and so forth), servers with and without co-processors (such as graphics processing units (GPUs) and configurable logic), servers with varying capacity and performance of memory and/or local storage, and servers with different networking performance levels. Example software resources can include different operating systems, application programs, and drivers. One example instance type can comprise the server computer 140 including a central processing unit (CPU) 144 in communication with the configurable hardware 142. The configurable hardware 142 can include programmable logic such as an FPGA, a programmable logic array (PLA), a programmable array logic (PAL), a generic array logic (GAL), or a complex programmable logic device (CPLD), for example.

The logic repository service 110 can generate configuration data 136 in response to receiving the API request 130. The generated configuration data 136 can be based on the application logic 132 and the host logic 134. Specifically, the generated configuration data 136 can include information that can be used to program or configure the configurable hardware 142 so that it performs the functions specified by the application logic 132 and the host logic 134. As one example, the compute services provider can generate the host logic 134 including logic for interfacing between the CPU 144 and the configurable hardware 142. In this manner, the host logic 134 can potentially reduce security and availability risks that could be introduced by the application logic 132. In other examples, the application logic 132 can communicate directly to the CPU 144 via an interface, such as PCIe, Ethernet, Infiniband, or other suitable interface.

Generating the configuration data 136 can include performing checks and/or tests on the application logic 132, integrating the application logic 132 into a host logic 134 wrapper, synthesizing the application logic 132, and/or placing and routing the application logic 132.

Generating the configuration data 136 can include compiling and/or translating source code of the application logic 132 and the host logic 134 into data that can be used to program or configure the configurable hardware 142. For example, the logic repository service 110 can integrate the application logic 132 into a host logic 134 wrapper. Specifically, the application logic 132 can be instantiated in a system design that includes the application logic 132 and the host logic 134. The integrated system design can be synthesized, using a logic synthesis program, to create a netlist for the system design. The netlist can be placed and routed, using a place and route program, for the instance type specified for the system design. The placed and routed design can be converted to configuration data 136 which can be used to program the configurable hardware 142. For example, the configuration data 136 can be directly output from the place and route program.

As one example, the generated configuration data 136 can include a complete or partial bitstream for configuring all or a portion of the configurable logic of an FPGA, including isolating, clearing, and or scrubbing portions of the configurable logic and memories and additional resources coupled to an integrated circuit comprising the FPGA. An FPGA can include configurable logic and non-configurable logic. The configurable logic can include programmable logic blocks comprising combinational logic and/or look-up tables (LUTs) and sequential logic elements (such as flip-flops and/or latches), programmable routing and clocking resources, programmable distributed and block random access memories (RAMs), digital signal processing (DSP) bitslices, and programmable input/output pins. The bitstream can be loaded into on-chip memories of the configurable logic using configuration logic (e.g., a configuration access port). The values loaded within the on-chip memories can be used to control the configurable logic so that the configurable logic performs the logic functions that are specified by the bitstream. Additionally, the configurable logic can be divided into different partitions or regions which can be configured independently of one another. As one example, a full bitstream can be used to configure the configurable logic across all of the regions and a partial bitstream can be used to configure only a portion of the configurable logic regions. For example, individual partial bitstreams for each of a host logic portion, a first application logic portion, a second application logic portion, etc., can be generated, downloaded to a configurable hardware platform, and used to independently program different portions of a single FPGA. Because the partial bitstreams can be applied independently, detailed knowledge of other portions of the FPGA need not be made available to others, thereby protecting user privacy. In some examples, some or all of the bitstreams can be further protected using encryption. The non-configurable logic can include hard macros that perform a specific function within the FPGA, such as input/output blocks (e.g., serializer and deserializer (SERDES) blocks and gigabit transceivers), analog-to-digital converters, memory control blocks, test access ports, and configuration logic for loading the configuration data onto the configurable logic.

The logic repository service 110 can store the generated configuration data 136 in a logic repository database 150. The logic repository database 150 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the logic repository service 110. Additionally, the logic repository service 110 can be used to store input files (such as the specifications for the application logic 132 and the host logic 134) and metadata about the logic designs and/or the users of the logic repository service 110. The generated configuration data 136 can be indexed by one or more properties such as a user identifier, an instance type or types, a marketplace identifier, a machine image identifier, and a configurable hardware identifier, for example.

The logic repository service 110 can receive an API request 160 to download configuration data. For example, the request 160 can be generated when a user of the compute resources 120 launches or deploys a new instance (e.g., an "F1.small" instance) within the compute resources 120. As another example, the request 160 can be generated in response to a request from an application executing on an operating instance. This can include, for example, requests to clear and scrub reconfigurable logic (such as by an application logic developer while testing and debugging new application logic), or requests to terminate an instance, which initiate disclosed methods for isolating, clearing, and scrubbing selected portions of the reconfigurable logic. The request 160 can include a reference to the source and/or destination instance, a reference to the configuration data to download (e.g., an instance type, a marketplace identifier, a machine image identifier, or a configurable hardware identifier), a user identifier, an authorization token, and/or other information for identifying the configuration data to download and/or authorizing access to the configuration data. If the user requesting the configuration data is authorized to access the configuration data, the configuration data can be retrieved from the logic repository database 150, and validated configuration data 162 (e.g. a full or partial bitstream) can be downloaded to the requesting instance (e.g., server computer 140). The validated configuration data 162 can be used to configure the configurable logic of the destination instance.

The logic repository service 110 can verify that the validated configuration data 162 can be downloaded to the requesting instance. Validation can occur at multiple different points by the logic repository service 110. For example, validation can include verifying that the application logic 132 is compatible with the host logic 134. In particular, a regression suite of tests can be executed on a simulator to verify that the host logic 134 performs as expected after the application logic 132 is added to the design. Additionally or alternatively, it can be verified that the application logic 132 is specified to reside only in reconfigurable regions that are separate from reconfigurable regions of the host logic 134, including ensuring that other application logic partitions are not affected by isolating, clearing, and scrubbing a selected application logic partition. As another example, validation can include verifying that the validated configuration data 162 is compatible with the instance type to download to. As another example, validation can include verifying that the requestor is authorized to access the validated configuration data 162. If any of the validation checks fail, the logic repository service 110 can deny the request to download the validated configuration data 162. Thus, the logic repository service 110 can potentially safeguard the security and the availability of the computing resources 120 while enabling a user to customize hardware of the computing resources 120.

As stated above, in some examples, operations described above for the logic repository service 110 can be performed using the server computer 140, using other resources within the compute resources 120, or using other resources besides the compute resources 120.

Figure 2:
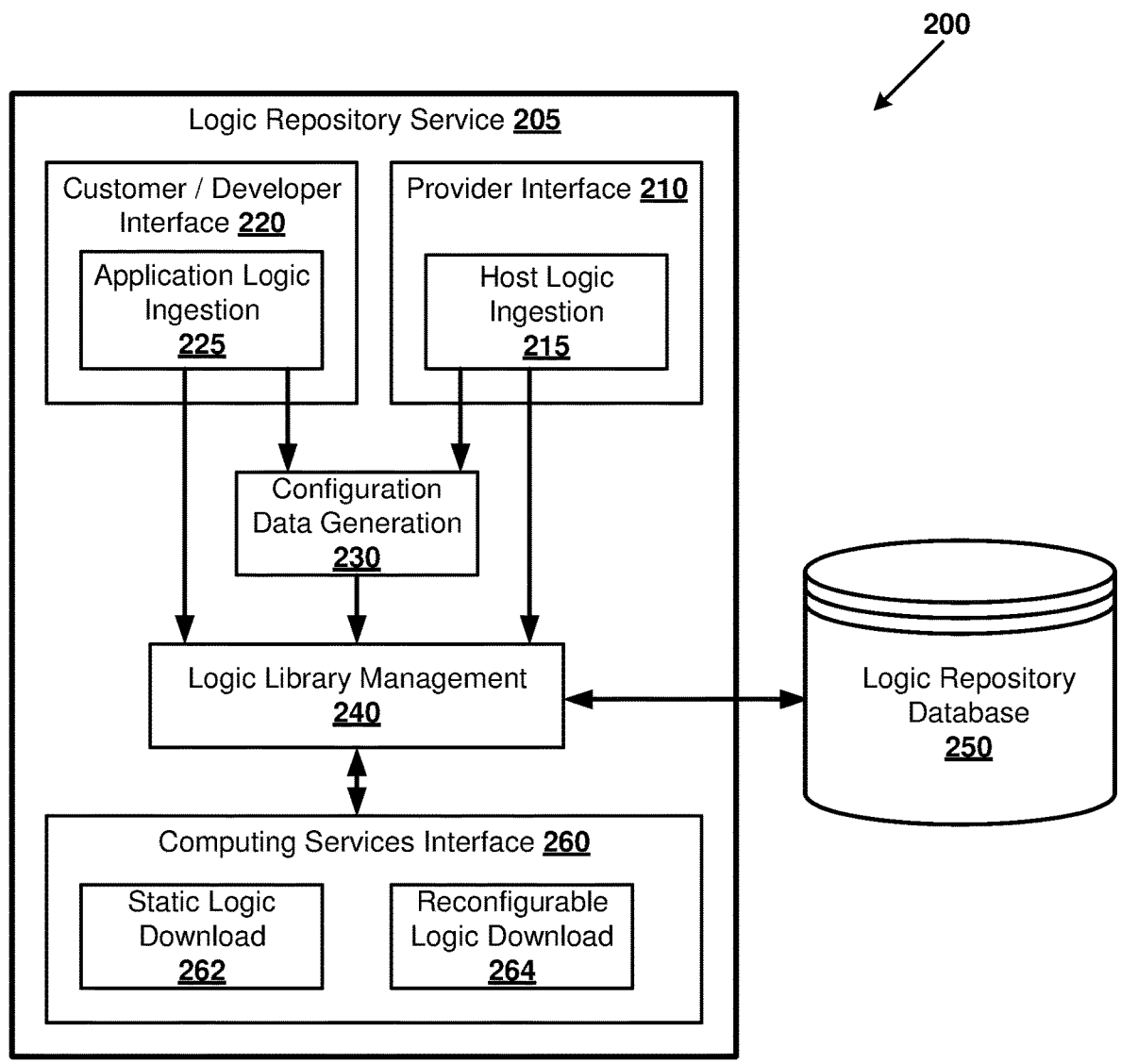
FIG. 2 is a system diagram showing an example architecture of a logic repository service.

FIG. 2 is a system diagram showing an example architecture 200 of a logic repository service 205. The logic repository service 205 can be software executing on a server computer managed by a compute services provider. The logic repository service 205 can be accessed through one or more web APIs.

The logic repository service 205 can include a provider interface 210 for servicing API requests by the compute service provider. The provider interface 210 can be used to authenticate that requests are from agents of the compute service provider, such as by authenticating the identity of the requestor using credentials provided in the request. The provider interface 210 can provide host logic ingestion functionality 215. In particular, the provider interface 210 can receive a request to upload a host logic design to the logic repository service 205 and the request can be processed by the host logic ingestion functionality 215. As described previously, the host logic can include logic for sandboxing the application logic to maintain the security and availability of the computing resources. Additionally, the host logic can be further divided into static logic and reconfigurable logic. The static logic can be configured during an initialization sequence (e.g., at boot time), whereas the reconfigurable logic can be configured at different times during the operation of the configurable logic. As one example, the PCI Express interface can specify that a PCI endpoint be booted and enumerated within about one hundred milliseconds after a reset signal is deasserted. The host logic can be divided into static logic that can be loaded within the allotted time window, and reconfigurable logic that can be loaded after the time window has passed. The static logic can be used as an interface between different reconfigurable regions. The host logic design can be specified using HDL source code, written in, for example, System Verilog, Verilog, or VHDL. The HDL source code can be encrypted or non-encrypted. In some examples, netlists describing logic components can be provided in addition to, or instead of, HDL source code. The host logic ingestion module 215 can be used to perform checks on the received host logic design, decrypt the host logic design, and/or provide versioning information for the host logic design. Additionally, the request can include information for associating the host logic design with one or more instance types. For example, some host logic designs may work only with one subset of instance types and other host logic designs may work only with a different subset of instance types.

The logic repository service 205 can include a customer-developer interface 220 for servicing API requests from the users of the logic repository service 205. The customer-developer interface 220 can be used to authenticate that requests are from users of the compute service provider, such as by authenticating the identity of the requestor using credentials provided in the request. For example, each of the users can be provided with an account that can be used to identify the user for access management, billing, and usage tracking. The users can be limited to viewing and modifying only the logic designs to which they are authorized to access. For example, the users can be prevented from uploading and/or modifying host logic.

The customer-developer interface 220 can include application logic ingestion functionality 225 for receiving and/or processing an application logic design. The application logic design can be specified using source code (e.g., HDL language code, expressed in SystemVerilog, Verilog, C, SystemC, or other suitable description language), a netlist including a list of configurable logic blocks and the connections between the configurable logic blocks, and/or configuration data. For example, the HDL code may describe instantiations of logic for performing isolation, clearing, and/or scrubbing operations, which will then be stitched into the configuration data by including proprietary netlists not accessible to the engineer developing the source code. As another example, the configuration data can include a full or partial bitstream which has been pre-compiled for at least certain portions before being uploaded to the logic repository service. The application logic will be combined with host logic (such as by a configuration data generation block 230) to create the logic that can be loaded onto a configurable hardware platform. Processing the application logic design can include translating and/or compiling source code to a lower level format (e.g., compiling OpenCL to generate behavioral or structural Verilog), verifying that required logic and/or signals are present (such as interface signals to the host logic), verifying that known restricted circuits are not present (such as ring oscillators), and other various tasks in preparation for generating configuration data.

The customer-developer interface 220 can accept various types of requests from a user. As one example, a user can request to create a configurable hardware image (CHI). A CHI can provide information for configuring an instance of configurable hardware within a computing environment. For example, a CHI can include one or more compatible instance types, the configuration data for configuring the configurable hardware, access permissions for controlling access to the CHI, and any other information associated with configuring the configurable hardware. The request to create the CHI can include fields for a design description or title, a production status of the design, whether or not the design is encrypted, a reference to source code for the design, a type of source code indicator, an instance type or types that are compatible with the configuration data, and a reference to a location to store reporting information.

The configuration data generation block 230 can be used to create configuration data for programming a reconfigurable logic device. For example, the configuration data can be based on an application logic design and a host logic design. As another example, the configuration data can be based on only an application logic design or only a host logic design. In particular, the configuration data generation block 230 can generate static logic based only on the host logic design. Additionally, the configuration data generation block 230 can generate reconfigurable logic for one or more reconfigurable regions of the configurable logic. For example, the configuration data generation block 230 can be used to generate host reconfigurable logic for a region reserved for host functions. As another example, the configuration data generation block 230 can be used to generate application reconfigurable logic for a region reserved primarily for application functions.

Inputs to the configuration data generation block 230 can be an application logic design (such as from the application logic ingestion 225), a host logic design (such as from the host logic ingestion 215), and/or constraints describing various implementation details (such as clock frequencies, partitioning information, placement information, a target technology, and so forth). The logic designs can include source code described using an HDL, a netlist, and/or configuration data. The configuration data generation block 230 can combine an application and a host design into one design to create the configuration data. As described in more detail with reference to FIG. 3, the configuration data generation block 230 can include a logic synthesis tool and a place and route tool. Using these tools, the configuration data generation block 230 can create configuration data for loading on a configurable hardware platform.

The output from the configuration data generation block 230 can be managed using the logic library management block 240. For example, the logic library management block 240 can associate user information with the configuration data and store the information at the logic repository database 250.

The computing services interface 260 can be used as an interface between the logic repository service 205 and computing resources. For example, when an instance is created on the computing resources, an API request can be sent to the computing services interface 260 and configuration data can be downloaded to the requesting resource. The static logic download component 262 can be used to download static logic to the configurable hardware platform on the requesting instance. Additionally, a request can be for reconfigurable logic, and the reconfigurable logic download component 264 can be used to service the request. Specifically, the reconfigurable logic download can retrieve the configuration data through the logic repository database 250 via the logic library management block 240. The request can be for reconfigurable host logic or for reconfigurable application logic.

Figure 3:
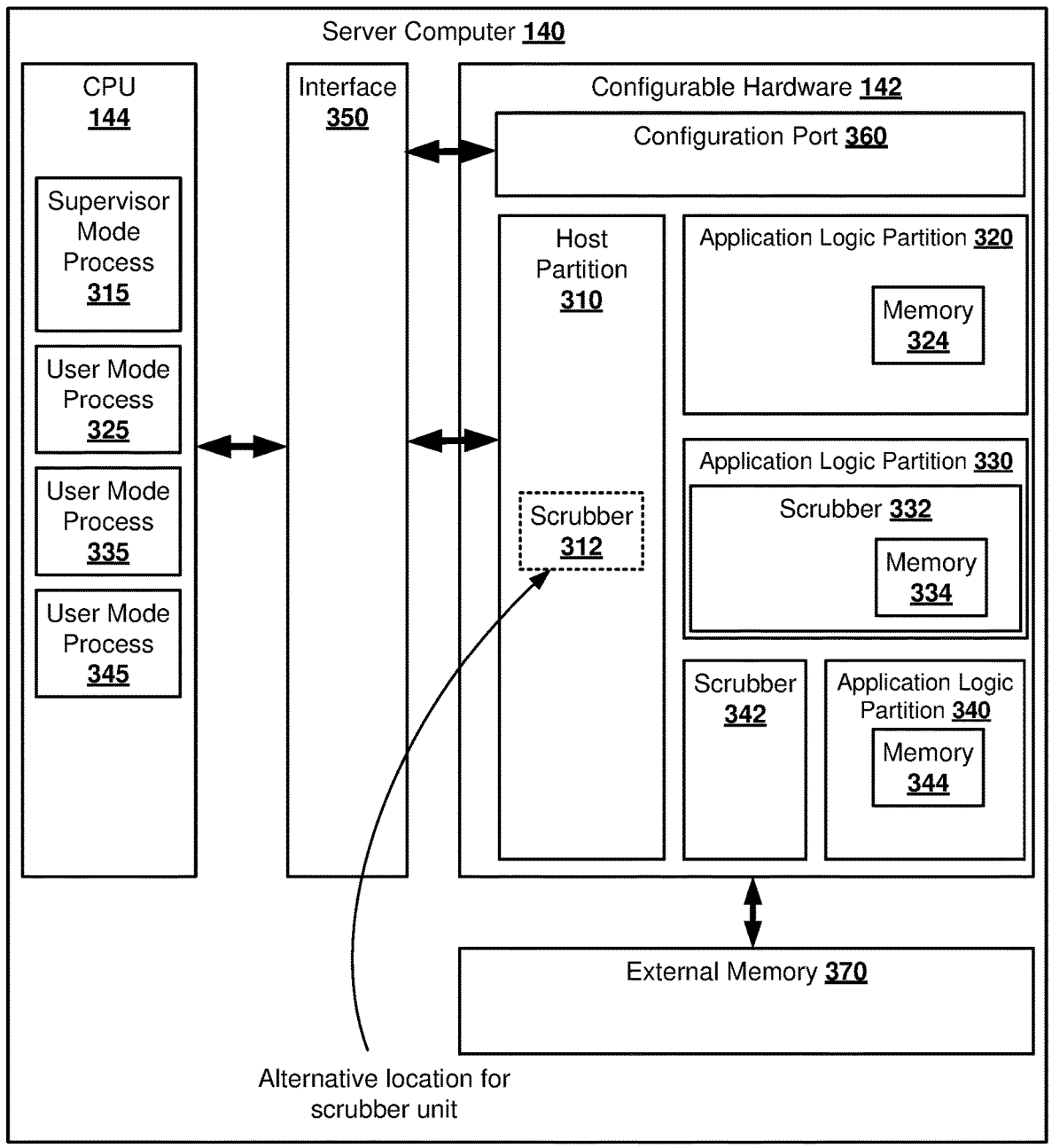
FIG. 3 is a block diagram outlining an example configuration of a system including application logic that can be cleared before reprogramming, as can be implemented in certain examples of the disclosed technology.

FIG. 3 is a block diagram 300 outlining an example host computer 140 supporting a virtualized reconfigurable logic environment, as can be implemented in certain examples of the disclosed technology.

As shown, the configurable hardware 142 includes reconfigurable logic devices that have been programmed to implement a number of partitions. A host logic partition 310 is configured to include control logic for supervising and controlling the operation of application logic partitions. The host partition can supervise operations of the user partitions, including isolating, clearing, and scrubbing data from individual ones of the application logic partitions using a scrubber circuit 312. The host logic partition 310 is configured so that it can only be accessed from a supervisor mode process 315 executing on the general purpose CPU 144. The host logic partition 310 includes static logic, which is typically reprogrammed infrequently, and dynamic logic, which is typically reprogrammed more frequently. For example, the dynamic logic may be reconfigured each time the application logic partition 320 is reprogrammed or modified. The host logic partition 310 further includes control signal generators, which send and receive control signals to and from the application logic partition 320.

The configurable hardware 142 further includes a first application logic partition 320 comprising reconfigurable logic resources and memory 324. The memory 324 can be implemented in a number of different ways, including with embedded/internal FPGA memory circuits, such as: block RAMs, distributed RAMs, configuration memory, and other forms of addressable internal memory. The application logic partition 320 can be isolated from other partitions of the configurable hardware 142 by, for example, reprogramming interconnect or logic at the interface of the application logic partition 320 or by setting values in control registers that assert controls signals on circuits, such as tri-state gates, pass gates, and/or multiplexers in order to electrically isolate the application logic partition 320 from the rest of the configurable hardware 142.

The configurable hardware 142 further includes a second application logic partition 330. As shown in FIG. 3, user logic in the application logic partition has been overwritten with a scrubber circuit 332. For example, the scrubber circuit 332 can be provided by applying a configuration bitstream with information for implementing the scrubber to the configuration port 360. In other examples, the scrubber circuit 332 is provided by using an internal configuration circuit to overwrite user logic with the scrubber circuit. The scrubber circuit includes circuits to erase data stored in storage elements of the reconfigurable logic (e.g., latches, flip-flops, and memories), as well as embedded memory 344. The configurable hardware 142 further includes a third application logic partition 340, which is illustrated as an alternate example. The third application logic partition 340 has a third scrubber circuit 342 coupled to it, and internal memory 344. The third scrubber circuit 342 is configured to erase data stored in storage elements of the reconfigurable logic for the application logic partition 340 and the memory 344. Thus, in some examples, only the application logic partitions include scrubbers. In other examples, only the host logic partition 310 includes the scrubber circuit 312. In other examples, a scrubber circuit is implemented across circuitry contained in both the host logic partition 310 and the application logic partition 320.

Any suitable memory type can be included within the partition's reconfigurable device memories 324, 334, or 344. For example, FPGAs often have compact larger RAMs, dubbed block RAMs, which can be implemented using static RAM (SRAM) or embedded dynamic RAM (eDRAM). The scrubber circuit can step through each address of the internal and/or external memories and write a known pattern in order to erase data previously stored in the memory. For example, patterns such as all zeroes, all ones, a known pattern (e.g., 0xdeadbeef), or random patterns can be written to the memory using the scrubber circuits. In some other examples, other types of RAM such as distributed RAM, look-up table (LUT) RAM, or configuration memories associated with that portion of the application logic partition can also be reprogrammed using the scrubber circuit. In some examples, an FPGA vendor provides a configuration instance that can be used to implement the scrubber circuit. In such examples, the configuration circuit may include a DMA direct memory access interface that can be coupled to one of the processes executing on the CPU 144 in order to control clearing and scrubbing operations. In other examples, clearing can be accomplished by applying a configuration bitstream to the configurable hardware 142 using a partial reconfiguration mode. In some examples, the partitions are arranged to facilitate applying such bitstreams by aligning the partition boundaries with address boundaries of the associated configuration logic. The configuration bitstreams can be used to program the configurable hardware 142 by applying the bitstream to a configuration port 360.

The server computer 140 can further include external memory 370 that can be coupled to one or more of the logic partitions within the configurable hardware 142. For example, SRAM, DRAM, electrically-erasable programmable read only memory (EEPROM), and/or flash memory can be electrically connected to the configurable hardware 142 such that one or more of the partitions can read or write to the external memory 370. Typically, some control circuits are provided in order to prevent individual partitions from writing to the same regions of the external memory 370. For example, each of the partitions can be associated with a different address range of the external memory 370. A further function of the scrubber circuits can be erasing data stored in the external memory by, for example, storing known patterns of zeroes, known patterns of ones, or random patterns in the external memory 370. For example, the different types of scrubbers 312, 332, and/or 342 can all be coupled to erase the external memory 370.

In some examples, the application logic partitions are arranged so that they can be reconfigured without adjusting connections to the other application logic portions. This allows for any of the application logic partitions to be reprogrammed independently of the other application logic partitions. For example, if two or more application logic partitions are included on a single FPGA integrated circuit, any other portions of the FPGA can be partially reconfigured in order to reprogram only one of the application logic partitions selected. In some examples, FPGA portions are selected, based in part on programming granularity and features of the targeted FPGAs. For example, FPGA portions may be created by assigning a range of rows or a range of columns of arrayed logic components in an FPGA to different portions.

The host logic and application logic portions are associated with separate host partitions (e.g., separate processes or virtual machines) executing on the CPU 144. For the example shown in FIG. 3, the host logic partition 310 is associated with a supervisor mode process 315 executing on the CPU 144. The supervisor mode process 315 executes at a higher level of privilege than other processes of the CPU. For example, an administrator of the server computer 140 may be the only entity with sufficient permissions to use or control the supervisor mode process 315. Each of the application logic partitions 320, 330, and 340 are associated with a corresponding user mode process 325, 335, and 345, respectively. The user mode processes have a lower permission level than the supervisor mode process 315, and thus other users, in addition to an administrator, can control and use the user mode processes.

The CPU 144 is coupled to the configurable hardware 142 via an interface 350. The interface 350 can be implemented with any suitable interconnect technology, including, but not limited to: PCIe, Ethernet, and Infiniband. Each of the application logic portions uses a different reserve portion of the interface 350 in order to communicate to its associated user mode process. For example, each of the user mode processes may be allowed access to a different range of memory addresses, and the host logic partition 310 in turn couples each of the individual application logic portions to only the memory address ranges associated with their corresponding process. Thus, the application logic is further independent from other application logic, because data cannot be sent to or from user mode processes other than those user mode processes associated with the application logic partition. Similarly, the supervisor mode process 315 can be coupled to the host logic partition 310 via another restricted memory range.

As shown in FIG. 3, some of the components may be configured to occupy different portions of the configurable hardware 142 in alternative examples. For example, an application logic partition may not be coupled to the host logic partition 310, but instead be coupled to its associated user mode process directly via an interconnect interface. For example, the interface 350 can be configured such that the application logic partition writes to a specific memory address range, which in turn is associated with a particular user mode process, without communicating via the host logic partition 310.

Further, memory that may accessible to the configurable hardware 142 is not limited to the reconfigurable device memories 324, 334, and 344. For example, an external memory 370, located on a separate integrated circuit die, can be coupled to I/O units of the configurable hard via an I/O interface bus. The host logic partition 310 can be configured to write to and read from the external memory 370. In some examples, separate external memory dies are provided for each of the application logic partitions, while in other examples, the host logic partition 310 is configured to maintain separation between application logic partitions.

In some examples, each of the processes coupled to the host logic partition 310 and/or the application logic partitions 320, 330, or 340 are associated with a process that is executed in a different virtual machine hosted by the CPU 144. In other examples, two or more of the processes can execute within the same virtual machine.

Figure 4:
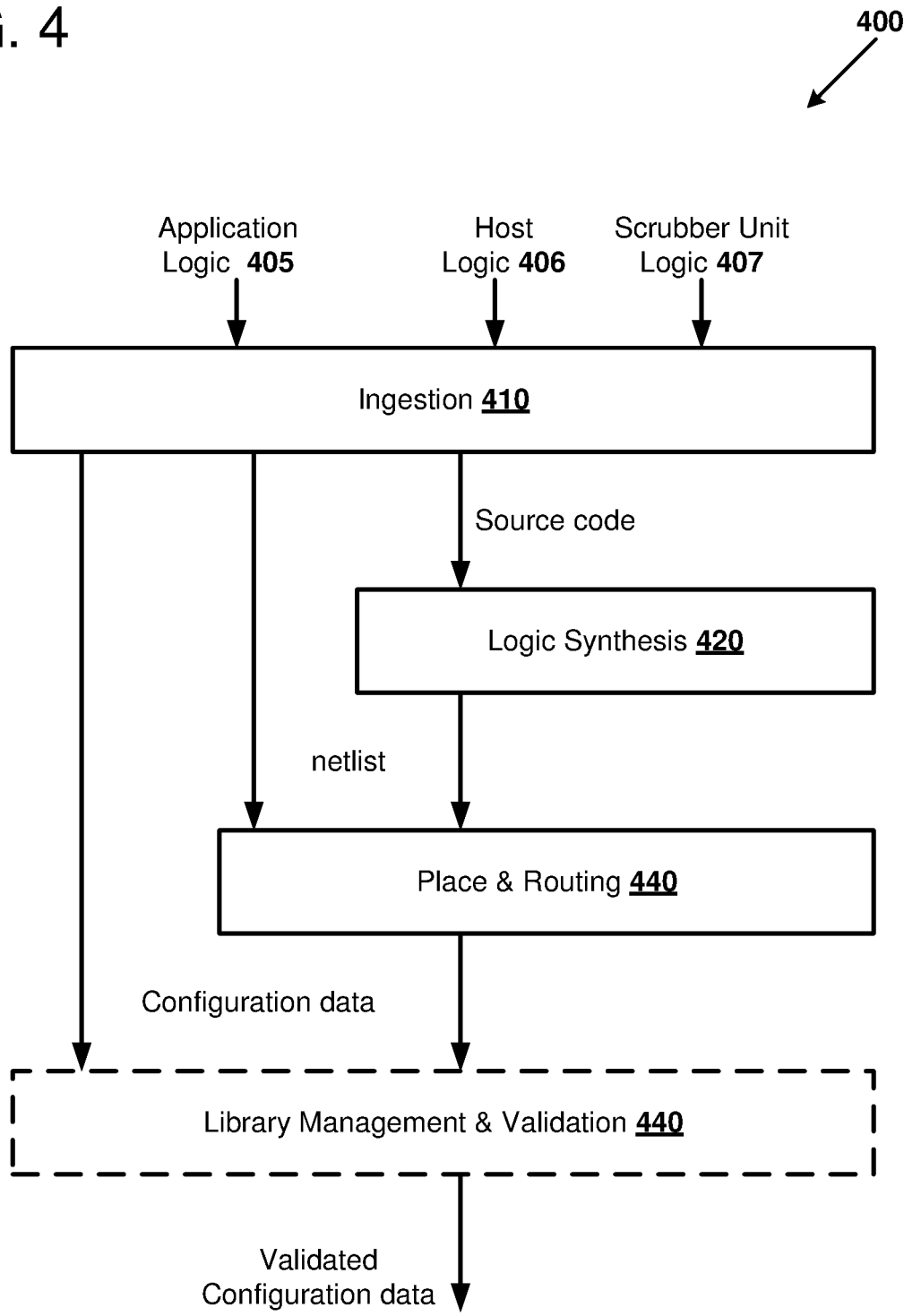
FIG. 4 illustrates an example of ingestion and generation of configuration data as can be performed by a logic repository service.

FIG. 4 illustrates an example flow 400 of ingesting logic designs and producing configuration data as can be performed by a logic repository service. During ingestion 410, descriptions of application logic 405, host logic 406, and/or scrubber logic 407 can be received by a logic repository service. In some examples, the application logic 405 instantiates one or more instances of cells for the scrubber logic 407, and scrubber circuits are accordingly incorporated into the application logic. In some examples, a scrubber circuit is instantiated in RTL or a netlist and as a result, a scrubber circuit is incorporated into the application logic to perform the desired erasing of memory and/or storage units. The logic design can be encrypted, such as by using the IEEE 1735-2014 encryption standard. The logic design can be decrypted during ingestion 410 or during a later step of the flow 400.

As one example, source code for the application logic 405 and scrubber logic 407 can be received during the ingestion 410 and the application logic and the scrubber logic can be combined into a design to produce source code for logic synthesis 420 for programming a first portion of a reconfigurable logic device. Source code for the host logic 406 can be used to produce source code for logic synthesis 420 for programming a second portion of the reconfigurable logic device. The logic synthesis 420 can be used to transform a specification written in behavioral and/or structural RTL into a netlist based on a target technology. For example, the logic synthesis 420 can target different configurable logic technologies, such as FPGAs having different architectures, manufacturing processes, capacities, and/or manufacturers. The netlist can include a number of configurable logic blocks, non-configurable blocks (e.g., hard or soft macros), and the connections between the different blocks. The netlist can be a logical netlist where blocks of the netlist are enumerated but unplaced within the target technology. The netlist can be used as input to place and route 430. The place and route 430 can take the instances of the configurable blocks from the netlist and the routing information, and map the blocks to a physical, reconfigurable logic device. The place-and-routed design can include a physical mapping for each of the logical components of the netlist. Additionally or alternatively, the place and route 430 can be timing driven so that the netlist is modified based on timing constraints of the design and the physical constraints of the physical device. The output of the place and route 430 can be configuration data, such as a bitstream image. The configuration data can be partitioned or divided into different components. For example, the configuration data can include data associated with static host logic, reconfigurable host logic, and/or reconfigurable application logic. The different components can be overlapping or non-overlapping. For example, the static host logic can be routed through regions that are used by the reconfigurable application logic. Thus, a partial bitstream for the reconfigurable application logic can also include portions of the static host logic.

As another example, a netlist for the application logic and/or the host logic can be received during the ingestion 410. As a specific example, a netlist can be received for the application logic and source code can be received for the host logic. In this case, the host logic can be synthesized with the logic synthesis 420 to generate a netlist for the host logic, and the netlists for the host and application logic can be combined into a single design to produce a netlist for the place and route 430. As another example, configuration data for the application logic and/or the host logic can be received during the ingestion 410. For example, a partial bitstream for the application logic design can be received, or a full bitstream for the host and application logic design can be received. As another example, clearing bitstreams, which clear all or a portion of partitions of a reconfigurable logic device when applied to a configuration port or internal configuration unit, can be received. The bitstreams can be selected based on attributes of the underlying reconfigurable logic device manufacturer, integrated circuit design, capacity, and other attributes.

As another example, a timing report can provide a static timing analysis showing whether the design meets timing specifications of the configurable hardware. The logic synthesis 420 and the place and route 430 can involve random, non-deterministic steps that vary with each run of the tools so that each run of the logic synthesis 420 and the place and route 430 may provide different results. Thus, if a developer has a design that does not meet timing (as indicated by the timing report), the developer may desire to rerun the logic synthesis 420 and/or the place and route 430. In this manner, the developer can iterate on their design by executing multiple synthesis and routing runs for the same design.

The library management and validation 440 functionality can be used to validate the user designs for the configurable logic at various points during the development and deployment steps. As one example, the validation 440 can include performing simulations to verify whether the application logic is compatible with the host logic so that the host logic can constrain the functionality of the application logic. The validation 440 can include comparing a netlist of the application logic and confirming that the application logic meets capacity and area restraints of the configurable hardware platform. For example, the application logic can be restricted to use only logic within one or more reconfigurable regions. If the application logic is outside of those regions, then the application logic can be rejected. Additionally, the application logic can be ingested as a bitstream, and the bitstream can be validated by the validation 440. The validation of a bitstream can include comparing a portion of the ingested bitstream data corresponding to the host logic to a baseline version of the host logic to confirm that the host logic is not corrupted. The output from the validation 440 can be validated configuration data.

Figure 5:
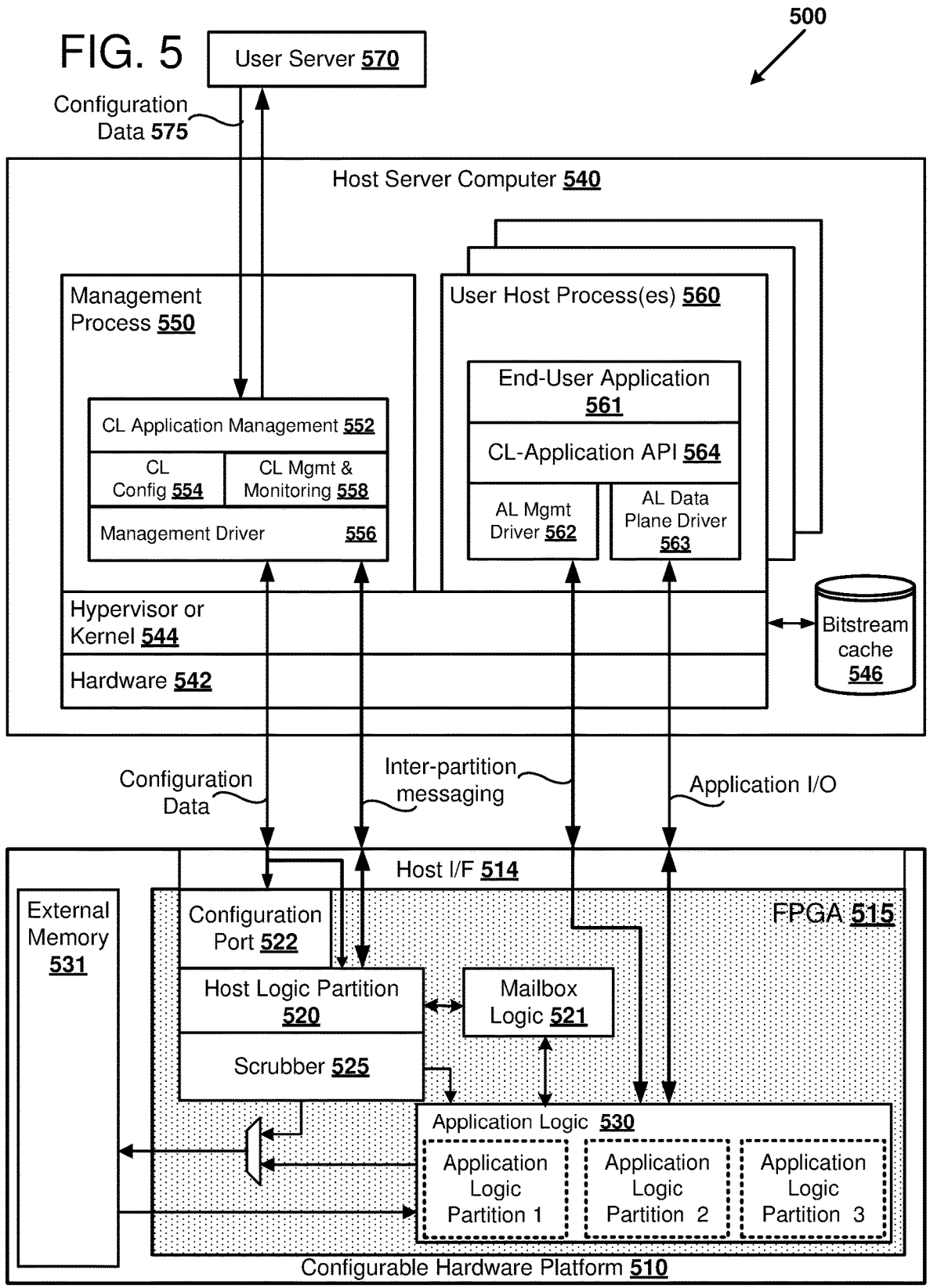
FIG. 5 shows further details of the example system of FIG. 4 including components of a control plane and a data plane for configuring and interfacing to a configurable hardware platform.

FIG. 5 shows further details of an example system 500 including components of a control plane and a data plane for configuring and interfacing to a configurable hardware platform 510. The control plane includes functions for initializing, monitoring, reconfiguring, and tearing down the configurable hardware platform 510. The data plane includes functions for communicating between a user's application and the configurable hardware platform 510. The control plane can be accessible by users or services having a higher privilege level and the data plane can be accessible by users or services having a lower privilege level. In one example, the configurable hardware platform 510 is connected to a server computer 540 using a local interconnect, such as PCIe. In some examples, a different interconnect, such as Ethernet or Infiniband are used. In an alternative example, the configurable hardware platform 510 can be integrated within the hardware of the server computer 540. As one example, the server computer 540 can be one of the plurality of server computers 802A-802C of the compute service provider 800 of FIG. 8.

The host server computer 540 has underlying hardware 542 including one or more CPUs, memory, storage devices, interconnection hardware, etc. Running a layer above the hardware 542 is a hypervisor or kernel layer 544. The hypervisor or kernel layer can be classified as a type 1 or type 2 hypervisor. A type 1 hypervisor runs directly on the host hardware 542 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management process 550 (such as Domain 0 of the Xen hypervisor) can be part of the hypervisor or separated therefrom and generally includes device drivers needed for accessing the hardware 542.

Configuration data, such as bitstreams used to configure reconfigurable logic devices, such as an FPGA 515 on the configurable hardware platform 510, can be cached in a bitstream cache 546, which may be implemented using, for example, memory or storage devices coupled to the host server computer. After storing a bitstream in the bitstream cache 546 a first time, the configurable hardware platform can be re-programmed using the cached bitstreams multiple times, thereby avoiding the overhead of transferring configuration data via network storage.

User host processes 560 are logical units of isolation within the hypervisor. Each user partition 560 can be allocated its own portion of the hardware layer's memory, CPU allocation, storage, interconnect bandwidth, etc. Additionally, each user host process 560 can include a virtual machine and its own guest operating system. As such, each user host process 560 is an abstract portion of capacity designed to support its own virtual machine independent of the other partitions. The user host processes 560 execute at a lower level of privilege than the management process 550 (such as Domain U of the Xen hypervisor).

The management process 550 can be used to perform management services for the user host processes 560 and the configurable hardware platform 510. The management process 550 can communicate with web services (such as a deployment service, a logic repository service, and a health monitoring service) of the compute service provider, the user host processes 560, and the configurable hardware platform 510. The management services can include services for launching and terminating user host processes 560, and configuring, reconfiguring, and tearing down the configurable logic of the configurable hardware platform 510. As a specific example, the management process 550 can launch a new user host process 560 in response to a request from a deployment service (such as the deployment component 826 of FIG. 8). The request can include a reference to an MI and/or a CHI. The MI can specify programs and drivers to load on the user host process 560 and the CHI can specify configuration data to load on the configurable hardware platform 510. The management process 550 can initialize the user host process 560 based on the information associated with the MI and can cause the configuration data associated with the CHI to be loaded onto the configurable hardware platform 510. The initialization of the user host process 560 and the configurable hardware platform 510 can occur concurrently so that the time to make the instance operational can be reduced.

The management process 550 can be used to manage programming and monitoring of the configurable hardware platform 510. The management process 550 can also be used to send and receive data for performing and acknowledging erasing operations, such as isolation, clearing, and scrubbing of reconfigurable logic devices and associated resources (e.g., memories). The data is sent between the management process 550 and the configurable hardware platform 510. By using the management process 550 for these purposes, access to the configuration data and the configuration ports of the configurable hardware platform 510 can be restricted. Specifically, users with lower privilege levels can be restricted from directly accessing the management process 550. Further, users with lower privilege levels can be restricted from accessing other application logic partitions. Thus, the configurable logic cannot be modified without using the infrastructure of the compute services provider and any third party IP used to program the configurable logic can be protected from viewing by unauthorized users. Further, unauthorized users are also prevented from inspecting data stored in any unauthorized partitions on the configurable hardware platform 510.

The management process 550 can include a software stack for the control plane to configure and interface to a configurable hardware platform 510. The control plane software stack can include a configurable logic (CL) application management layer 552 for communicating with web services (such as a logic repository service or a health monitoring service), the configurable hardware platform 510, and the user host processes 560. For example, the CL application management layer 552 can issue a request to fetch configuration data in response to a user host process 560 being launched. The CL application management layer 552 can communicate with the user host process 560 using shared memory of the hardware 542 or by sending and receiving inter-partition messages over the interconnect connecting the server computer 540 to the configurable hardware platform 510. Specifically, the CL application management layer 552 can read and write messages to mailbox logic 521 of the configurable hardware platform 510. The messages can include requests by an end-user application 561 to reconfigure or tear-down (terminate) the configurable hardware platform 510. The CL application management layer 552 can issue a request to a logic repository service to fetch configuration data in response to a request to reconfigure the configurable hardware platform 510. The CL application management layer 552 can initiate a tear-down sequence in response to a request to terminate the configurable hardware platform 510. The CL application management layer 552 can perform watchdog related activities to determine whether the communication path to the user host process 560 is functional.

The control plane software stack can include a CL configuration layer 554 for accessing the configuration port 522 (e.g., a configuration access port) of the configurable hardware platform 510 so that configuration data can be loaded onto the configurable hardware platform 510. For example, the CL configuration layer 554 can send a command or commands to the configuration port 522 to perform a full or partial configuration of the configurable hardware platform 510. The CL configuration layer 554 can send the configuration data (e.g., a bitstream) to the configuration port 522 so that the configurable logic can be programmed according to the configuration data. The configuration data can specify host logic and/or application logic.

The control plane software stack can include a management driver 556 for communicating over the physical interconnect connecting the server computer 540 to the configurable hardware platform 510. The management driver 556 can encapsulate commands, requests, responses, messages, and data originating from the management process 550 for transmission over the physical interconnect. Additionally, the management driver 556 can de-encapsulate commands, requests, responses, messages, and data sent to the management process 550 over the physical interconnect. The management driver 556 can communicate with the host logic partition 520 by addressing transactions to the address range assigned to the interconnect.

The control plane software stack can include a CL management and monitoring layer 558. The CL management and monitoring layer 558 can monitor and analyze transactions occurring on the physical interconnect to determine a health of the configurable hardware platform 510 and/or to determine usage characteristics of the configurable hardware platform 510. For example, the CL management and monitoring layer 558 can monitor whether configuration data is successfully deployed on the configurable hardware platform 510 and can cause a report to be transmitted to the logic repository service indicating the status of the deployment.

A user server 570 can be used to send configuration data 575 to the management process 550. The configuration data 575 can be validated and then used to program a portion (e.g., one or more configurable logic partitions) of application logic 530. The user server 570 can also send commands to the management partition to initiate operation of the programmed partitions. As execution proceeds, commands to perform isolation, clearing, and/or scrubbing operations can be send from the user server 570 via the management process 550. In some alternative examples, the user server 570 communicates with one of the user host partitions in order to send data for erasing memory and storage within and associated with a user application partition.

The configurable hardware platform 510 can include non-configurable hard macros and configurable logic. For example, the FPGA 515 can include the host logic partition 520, the scrubber circuit 525, the configuration port 522, mailbox logic 521, and the application logic 530. The FPGA 515 can be coupled to external components, such as external memory 531. The hard macros can perform specific functions within the configurable hardware platform 510, such as input/output blocks (e.g., serializer and deserializer (SERDES) blocks and gigabit transceivers), analog-to-digital converters, memory control blocks, test access ports, and a configuration port 522. The configurable logic can be programmed or configured by loading configuration data onto the configurable hardware platform 510. For example, the configuration port 522 can be used for loading the configuration data. As one example, configuration data can be stored in a memory (such as a Flash memory) accessible by the configuration port 522 and the configuration data can be automatically loaded during an initialization sequence (such as during a power-on sequence) of the configurable hardware platform 510. Additionally, the configuration port 522 can be accessed using an off-chip processor or an interface within the configurable hardware platform 510.

The configurable hardware platform 510 can include a scrubber circuit 525 that is configured to erase data from the application logic 530. For example, the scrubber circuit 525 can reconfigure the logic so that application logic used by a previous user of an application logic partition cannot be discerned by a subsequent user of the partition. Further, the scrubber circuit 525 can erase values stored in memory and storage elements of the application logic partitions. For example, flip-flops and latches having set or reset inputs can be asserted to erase values stored therein. RAMs within the application logic partitions can be cleared using a built-in reset function, or by the scrubber iteratively storing reset values into the RAMs. For examples, patterns of all ones, all zeroes, specified patterns (e.g., 0xdeadbeef), or random patterns can be written to erase the RAMs and other memories. Further, other logic elements, such as I/O circuits can be disabled or reset by, for example, deasserting a tri-state gate, pass gate, or multiplexer input, resetting counter values, resetting head/tail pointers for FIFOs or other queues, or other suitable erase operations.

The configurable logic can be programmed to include a host logic partition 520 and application logic 530 including a number of application logic partitions. The host logic partition 520 can shield the interfaces of at least some of the hard macros from the end-users so that the end-users have limited access to the hard macros and to the physical interconnect. For example, the host logic can restrict access of the user host processes 560 to only access their associated configurable logic partition(s) (e.g., access to only one of application logic partition 1, application logic partition 2, or application logic partition 3) within the application logic 530. In a PCIe context, this can be implemented by assigning different user host partitions to different memory address ranges by configuring the base address registers (BARs) to reserve certain memory address ranges for certain combinations of host partitions and configurable logic partitions.

The application logic 530 can include both hard macros and configurable logic. The application logic 530 can be divided into two or more portions, and each of the portions can be assigned to one or more of the user application logic partitions. Each of the configurable logic partitions are excluded from accessing other partitions of the configurable hardware platform by the host logic partition 520, which manages partitioning of the application logic 530 resources, and communications between the application logic 530 and user host processes 560.

The host logic partition 520 can further be coupled to the mailbox logic 521, the configuration port 522, the host interface 514, and the application logic 530. The end-users can cause the user-configurable application logic 530 to be loaded on the configurable hardware platform 510, and can communicate with the configurable application logic 530 from the user host processes 560.

The host interface 514 can include circuitry (e.g., hard macros and/or configurable logic) for signaling on the physical interconnect and implementing a communications protocol. The communications protocol specifies the rules and message formats for communicating over the interconnect.

In alternative examples, the partitions within the application logic 530 are configured to communicate their respective associated user host processes 560 without communicating through the host logic partition 520. For example, in a PCIe context, each partition is associated with a different memory address range, and data can be sent to and from the partition using DMA messaging. For examples where an FPGA is programmed with an internal configuration circuit, the circuit can be programmed by sending commands and data via DMA messaging.

In addition to embedded/internal memories within the application logic 530, a separate memory 531 can be coupled to the application logic 530. The memory 531, which may be located on a separate integrated circuit die, can be coupled to I/O units of the application logic 530 via an I/O interface bus. Further, the external memory 531 may also be cleared using the scrubber circuit 525. For example, the external memory 531 can include a synchronous dynamic random access memory device (DRAM), such as DDR, DDR2, DDR3, or DDR4 RAM, or a hybrid memory cube (HMC). Additional resources can also be coupled to the FPGA 515, including static RAM, flash memory, erasable programmable read only memories, including EPROMS and EEPROMS, network interface comprising network address information, or a pseudorandom number generator.

The application logic 530 can be used to communicate with drivers of the user host processes 560. In, for example, a PCIe context, communication channels may be implemented as a physical or virtual function mapped to an address range during an enumeration of devices connected to the physical interconnect. The application drivers can communicate with the application logic 530 by addressing transactions to an assigned address range. Specifically, the application logic 530 can communicate with an application logic management driver 562 to exchange commands, requests, responses, messages, and data over the control plane. The application logic 530 can communicate with an application logic data plane driver 563 to exchange commands, requests, responses, messages, and data over the data plane.

In some examples, one configurable logic partition of the application logic 530 is configured to communicate to one user host partition 560 using a single communication lane/channel. In some examples, one configurable logic partition of the application logic 530 is configured to communicate to two or more host partitions (e.g., processes or virtual machines) using a single communication lane/channel, or using a communication lane/channel for each host partition. In some examples, one host partition is configured to communicate to a plurality of two or more configurable logic partitions, each using a separate communication lane/channel.

The mailbox logic 521 can include one or more buffers and one or more control registers. For example, a given control register can be associated with a particular buffer and the register can be used as a semaphore to synchronize between the management process 550 and the user host process 560. As a specific example, if a partition can modify a value of the control register, the partition can write to the buffer. The buffer and the control register are accessible from the host logic partition 520. In alternative examples, buffer and the control register are accessible from both the host logic partition 520 and the application logic 530. When the message is written to the buffer, another control register (e.g., the message ready register) can be written to indicate the message is complete. The message ready register can be polled by the partitions to determine if a message is present, or an interrupt can be generated and transmitted to the partitions in response to the message ready register being written.

The user host processes 560 can include a software stack for interfacing an end-user process 560 to the configurable hardware platform 510. The application software stack can include functions for communicating with the control plane and the data plane. Specifically, the application software stack can include a CL-Application API 564 for providing the end-user process 560 with access to the configurable hardware platform 510. The CL-Application API 564 can include a library of methods or functions for communicating with the configurable hardware platform 510 and the management process 550. For example, the end-user application 561 can send a command or data to the configurable application logic 530 by using an API of the CL-Application API 564. In particular, the API of the CL-Application API 564 can interface with the application logic (AL) data plane driver 563 which can generate a transaction targeted to the application logic 530 which can communicate with the targeted partition. In this manner, the end-user application 561 can cause the configurable application logic 530 to receive, process, and/or respond with data to potentially accelerate tasks of the end-user application 561. As another example, the end-user application 561 can send a command or data to the management process 550 by using an API of the CL-Application API 564. In particular, the API of the CL-Application API 564 can interface with the AL management driver 562 which can generate a transaction targeted to the application logic 530 which can communicate with the mailbox logic 521. In this manner, the end-user application 561 can cause the management process 550 to provide operational or metadata about the configurable hardware platform 510 and/or to request that the configurable application logic 530 be reconfigured.

The application software stack in conjunction with the hypervisor or kernel 544 can be used to limit the operations available to perform over the physical interconnect by the end-user application 561. For example, the compute services provider can provide the AL management driver 562, the AL data plane driver 563, and the CL-Application API 564 (such as by associating the files with a machine image). These components can be protected from modification by only permitting users and services having a higher privilege level than the end-user to write to the files. The AL management driver 562 and the AL data plane driver 563 can be restricted to using only addresses within the address range of the associated application logic. Additionally, an input/output memory management unit (I/O MMU) can restrict interconnect transactions to be within the address ranges assigned to the respective partitions.

Figure 6:
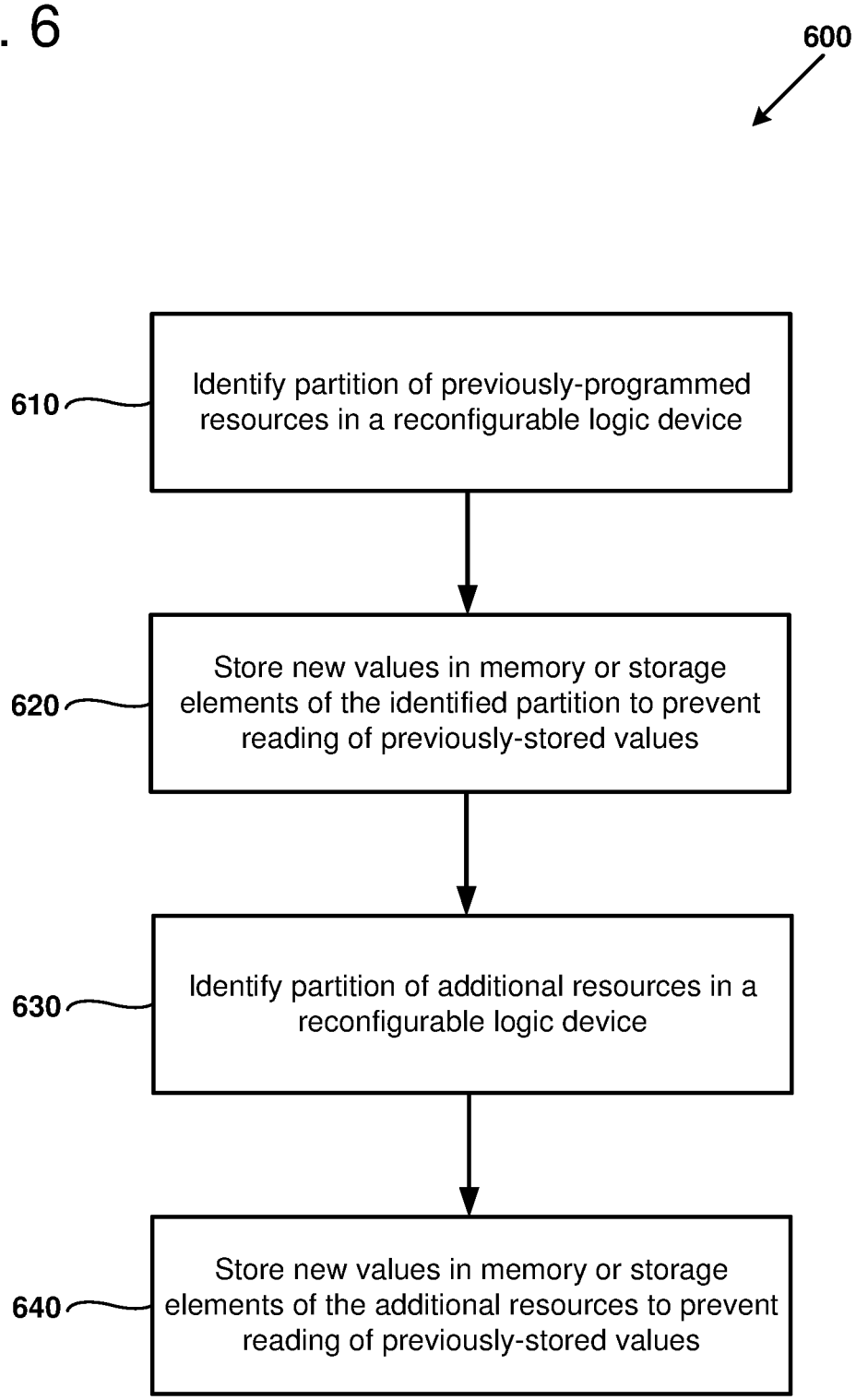
FIG. 6 is a flow chart outlining an example method of erasing data in a virtualized reconfigurable logic device.

FIG. 6 is a flowchart 600 outlining an example method of removing application data from a reconfigurable logic host, as can be performed in certain examples of the disclosed technology. For example, the host computer and configurable logic devices discussed above regarding FIGS. 1-5 can be used to implement the illustrated method.

At process block 610, a partition of previously programmed resources and a reconfigurable logic device is identified. For example, a partition may be identified by a user, such as an application developer, that desires to reprogram the logic resources. In other examples, a supervisor process may identify a partition of resources based on a virtualized host being terminated. For example a partition can be identified by an index that indicates a collection of logic resources and associated additional resources forming the partition. In some examples, a partition is defined based in part on attributes of an FPGA. For example, a partition can be identified by a range of row/column numbers in an FGPA array.

At process block 620, new values are stored in memory and/or storage elements of the partition identified at process block 610 in order to prevent reading of previously stored values from the reconfigurable logic device. For example, FPGA logic blocks typically contain a number of flip-flops, latches, and memory elements. Known values of zeroes or ones can be stored in these memory and storage elements in order to clear the data, thus preventing the previously-stored data from being accessed by subsequent users of the same physical reconfigurable logic device.

At process block 630, additional resources associated with the identified partition are identified. For example, if either an external memory or a portion of that external memory has been associated with and coupled to the identified partition of the reconfigurable logic device, then these memory resources are identified. For example, the memory can include a synchronous dynamic random access memory device (DRAM), such as DDR, DDR2, DDR3, DDR4 RAM, or a hybrid memory cube (HMC). Further examples of additional resources can include a static RAM, flash memory, erasable programmable read only memories, including EPROMS and EEPROMS, network interface comprising network address information, or a pseudorandom number generator.

At process block 640, new values are stored in the additional resources. For example, a multiplexer can be used to temporarily pass control of the memory to the scrubbing circuit so that the scrubbing circuit can step through the address range associated with the identified partition and write data patterns to the memory in order to erase values generated by running the virtualized instance.

Figure 7:
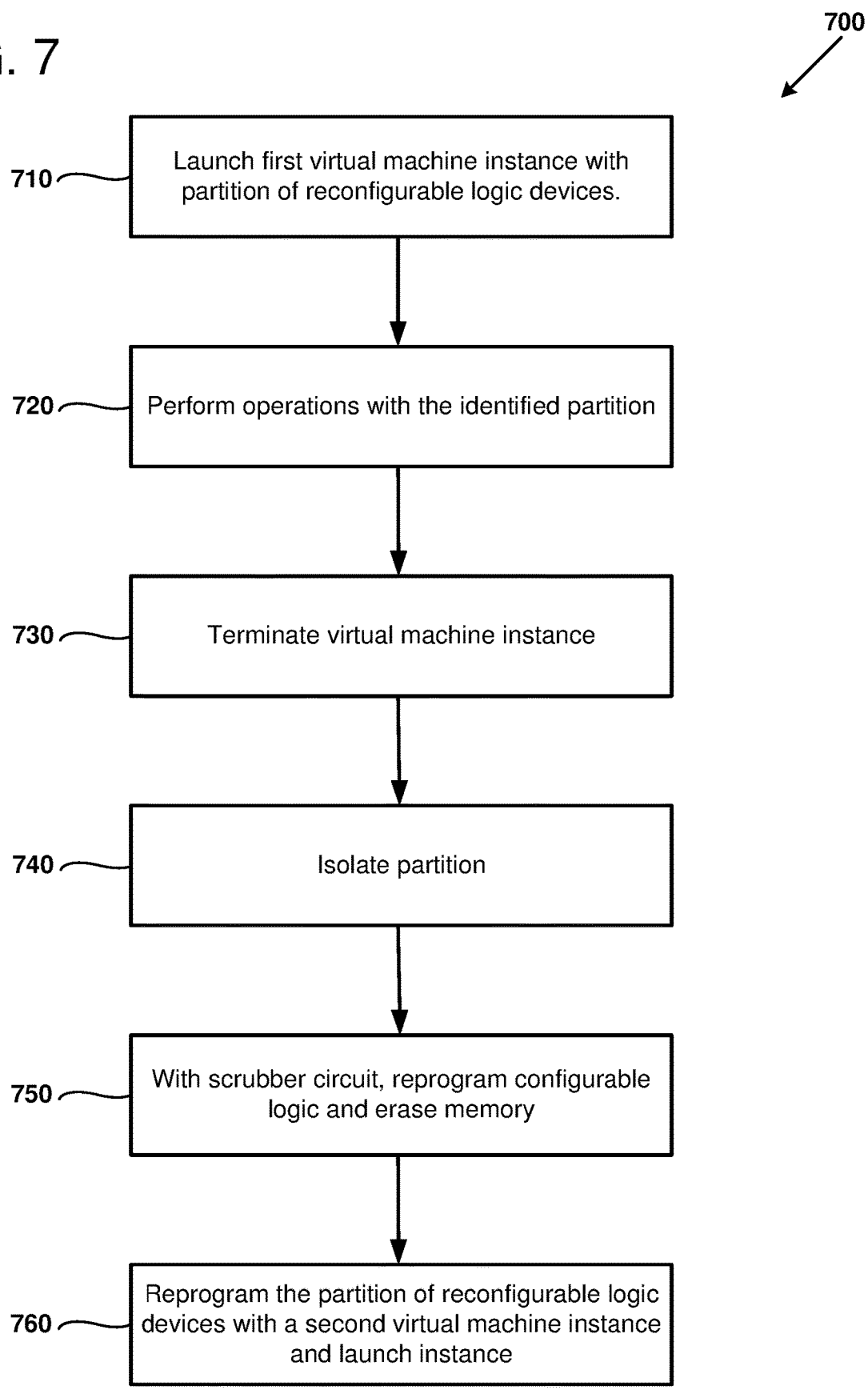
FIG. 7 is a flow chart outlining an example method of erasing data in a virtualized reconfigurable logic device.

FIG. 7 is a flowchart outlining an example method of scrubbing a virtualized host including reconfigurable logic devices, as can be performed in certain examples of the disclosed technology.

At process block 710, a first virtual machine instance is launched having a partition of the reconfigurable logic device. For example, the instance can have a user mode process executing the CPU that is coupled to read and write I/O to and from an application logic partition of an FPGA. The user process may communicate with the application partition directly, such as with a memory mapped bus, or via a host logic partition that is used to manage connections between a general purpose CPU and partitions of the reconfigurable logic device. The reconfigurable logic devices can be programmed at launch time by applying a configuration bitstream to the reconfigurable logic device. In some examples, the bitstream is applied in a partial configuration mode to only reprogram those resources associated with the user host process. In other examples, a default bitstream is loaded upon launching that can then later be reconfigured using configuration circuitry programmed within the reconfigurable logic device.

At process block 720, operations specified by the user are performed using the identified partition. For example, the application logic partition can be configured to provide hardware acceleration of functions for software executed by the user process on the CPU.

At some point, the virtual machine instance will be terminated. For example, a user may terminate the instance or a supervisor process may initiate termination of the instance. At process block 730, the virtual machine instance is terminated by removing process information on the hosted CPU. In some examples, a short period of time passes when transitioning from process block 730 to process block 740. For example, in many cases the system will be configured such that reconfigurable logic device partitions are cleared and scrubbed soon after the virtual machine instance terminates. In other examples, "lazy" clearing and scrubbing can be used, and user data is allowed to reside in the instance until the instance is reused by the same or different user. Such lazy scrubbing may save some compute resources, but presents additional risk of unauthorized access to data stored in the terminated partition.

At process block 740, the partition of the terminated instance is isolated. For example, interconnect and/or logic connecting the partition to the rest of the reconfigurable logic device can be reprogrammed in order to prevent access. In some examples, tri-state, or pass gate logic can be used to isolate the partition.

At process block 750, after the partition has been isolated, a scrubber circuit proceeds to reprogram configurable logic and erase associated memory. For example, a scrubber circuit can iterate multiple times and write configuration values, store different state values, or write to memories (e.g., by incrementing the memory write address with each iteration) in order to perform the reprogramming.

At process block 760, the identified partition of the reconfigurable logic devices is reprogrammed with a second virtual machine instance. A new instance is then subsequently launched using the compute host and its associated reconfigurable logic devices. Thus, unauthorized access to data generated by a previous user of the host computer, including its reconfigurable logic devices, can be prevented. In some examples, other users including the users of other reconfigurable logic partitions, have their own operation halted while the partition is isolated and reprogrammed. For example, activity of other partitions of reconfigurable device may be halted as a part of terminating the virtual machine instance at process block 730. Then the operations described above regarding process blocks 740, 750, and in some cases process block 760, are performed while the other partitions are halted. After the identified partition has been reprogrammed, operations on the other partitions can be resumed. In some cases, whether to halt operation of the other FPGAs may be determined by the architecture of the reconfigurable logic device. For example, the architecture of some FPGAs may not require that operations be halted while reprogramming certain portions of the FPGA.

Figure 8:
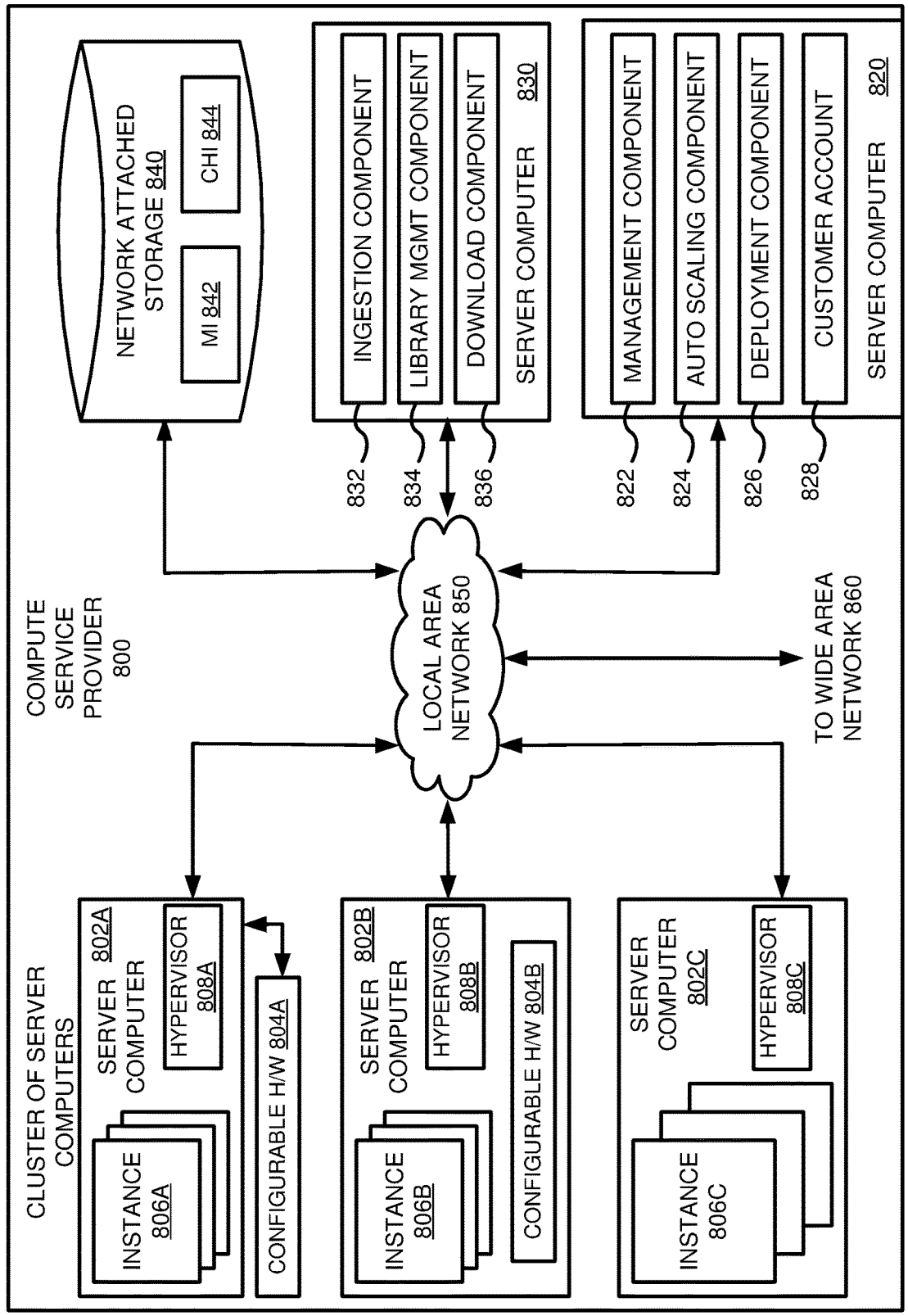
FIG. 8 is an example system diagram showing a plurality of virtual machine instances running in a multi-tenant environment including a logic repository service.

FIG. 8 is a computing system diagram of a network-based compute service provider 800 that illustrates one environment in which examples described herein can be used. By way of background, the compute service provider 800 (e.g., a cloud services provider) is capable of delivery of computing and storage capacity as a service to a community of end recipients. In some examples, the compute service provider can be established for an organization by or on behalf of the organization. That is, the compute service provider 800 may offer a "private cloud environment." In another example, the compute service provider 800 supports a multi-tenant environment, wherein a plurality of customers operate independently (e.g., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. Additionally, application developers can develop and run their hardware solutions on configurable hardware of the compute service provider platform. The SaaS model allows installation and operation of application software in the compute service provider. In some examples, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802C. While only three server computers are shown, any number can be used, and large centers can include thousands of server computers. The server computers 802A-802C can provide computing resources for executing software instances 806A-806C. In one example, the software instances 806A-806C are virtual machines. As known in the art, a virtual machine is an instance of a software implementation of a machine (i.e. a computer) that executes applications like a physical machine. In the example of a virtual machine, each of the servers 802A-802C can be configured to execute a hypervisor 808 or another type of program configured to enable the execution of multiple software instances 806 on a single server. Additionally, each of the software instances 806 can be configured to execute one or more applications.

It should be appreciated that although the examples disclosed herein are described primarily in the context of virtual machines, other types of instances can be utilized with the concepts and technologies disclosed herein. For instance, the technologies disclosed herein can be utilized with storage resources, data communications resources, and with other types of computing resources. The examples disclosed herein might also execute all or a portion of an application directly on a computer system without utilizing virtual machine instances.

The server computers 802A-802C can include a heterogeneous collection of different hardware resources or instance types. Some of the hardware instance types can include configurable hardware that is at least partially configurable by a user of the compute service provider 800. One example of an instance type can include the server computer 802A which is in communication with configurable hardware 804A. Specifically, the server computer 802A and the configurable hardware 804A can communicate over a local interconnect such as PCIe. Another example of an instance type can include the server computer 802B and configurable hardware 804B. For example, the configurable logic 804B can be integrated within a multi-chip module or on the same die as a CPU of the server computer 802B. Yet another example of an instance type can include the server computer 802C without any configurable hardware. Thus, hardware instance types with and without configurable logic can be present within the resources of the compute service provider 800.

One or more server computers 820 can be reserved for executing software components for managing the operation of the server computers 802 and the software instances 806. For example, the server computer 820 can execute a management component 822. A customer can access the management component 822 to configure various aspects of the operation of the software instances 806 purchased by the customer. For example, the customer can purchase, rent or lease instances and make changes to the configuration of the software instances. The configuration information for each of the software instances can be stored as a machine image (MI) 842 on the network-attached storage 840. Specifically, the MI 842 describes the information used to launch a VM instance. The MI can include a template for a root volume of the instance (e.g., an OS and applications), launch permissions for controlling which customer accounts can use the MI, and a block device mapping which specifies volumes to attach to the instance when the instance is launched. The MI can also include a reference to a configurable hardware image (CHI) 844 which is to be loaded on configurable hardware 804 when the instance is launched. The CHI includes configuration data for programming or configuring at least a portion of the configurable hardware 804.

The customer can also specify settings regarding how the purchased instances are to be scaled in response to demand. The management component can further include a policy document to implement customer policies. An auto scaling component 824 can scale the instances 806 based upon rules defined by the customer. In one example, the auto scaling component 824 allows a customer to specify scale-up rules for use in determining when new instances should be instantiated and scale-down rules for use in determining when existing instances should be terminated. The auto scaling component 824 can consist of a number of subcomponents executing on different server computers 802 or other computing devices. The auto scaling component 824 can monitor available computing resources over an internal management network and modify resources available based on need.

A deployment component 826 can be used to assist customers in the deployment of new instances 806 of computing resources. The deployment component can have access to account information associated with the instances, such as who is the owner of the account, credit card information, country of the owner, etc. The deployment component 826 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 826 can utilize the customer-provided configuration and cache logic to configure, prime, and launch new instances 806. The configuration, cache logic, and other information may be specified by a customer using the management component 822 or by providing this information directly to the deployment component 826. The instance manager can be considered part of the deployment component.

Customer account information 828 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, a listing of the MI's and CHI's accessible to the customer, etc.

One or more server computers 830 can be reserved for executing software components for managing the download of configuration data to configurable hardware 804 of the server computers 802. For example, the server computer 830 can execute a logic repository service comprising an ingestion component 832, a library management component 834, and a download component 836. The ingestion component 832 can receive host logic and application logic designs or specifications and generate configuration data that can be used to configure the configurable hardware 804. The library management component 834 can be used to manage source code, user information, and configuration data associated with the logic repository service. For example, the library management component 834 can be used to store configuration data generated from a user's design in a location specified by the user on the network-attached storage 840. In particular, the configuration data can be stored within a configurable hardware image 844 on the network-attached storage 840. Additionally, the library management component 834 can manage the versioning and storage of input files (such as the specifications for the application logic and the host logic) and metadata about the logic designs and/or the users of the logic repository service. The library management component 834 can index the generated configuration data by one or more properties such as a user identifier, an instance type, a marketplace identifier, a machine image identifier, and a configurable hardware identifier, for example. The download component 836 can be used to authenticate requests for configuration data and to transmit the configuration data to the requestor when the request is authenticated. For example, agents on the server computers 802A-B can send requests to the download component 836 when the instances 806 are launched that use the configurable hardware 804. As another example, the agents on the server computers 802A-B can send requests to the download component 836 when the instances 806 request that the configurable hardware 804 be partially reconfigured while the configurable hardware 804 is in operation.

The network-attached storage (NAS) 840 can be used to provide storage space and access to files stored on the NAS 840. For example, the NAS 840 can include one or more server computers used for processing requests using a network file sharing protocol, such as Network File System (NFS). The NAS 840 can include removable or non-removable media, including magnetic disks, storage area networks (SANs), redundant arrays of independent disks (RAID), magnetic tapes or cassettes, CD-ROMs, DVDs, or any other medium which can be used to store information in a non-transitory way and which can be accessed over the network 850.

The network 850 can be utilized to interconnect the server computers 802A-802C, the server computers 820 and 830, and the storage 840. The network 850 can be a local area network (LAN) and can be connected to a Wide Area Network (WAN) 860 so that end users can access the compute service provider 800. It should be appreciated that the network topology illustrated in FIG. 8 has been simplified and that many more networks and networking devices can be utilized to interconnect the various computing systems disclosed herein.

Figure 9:
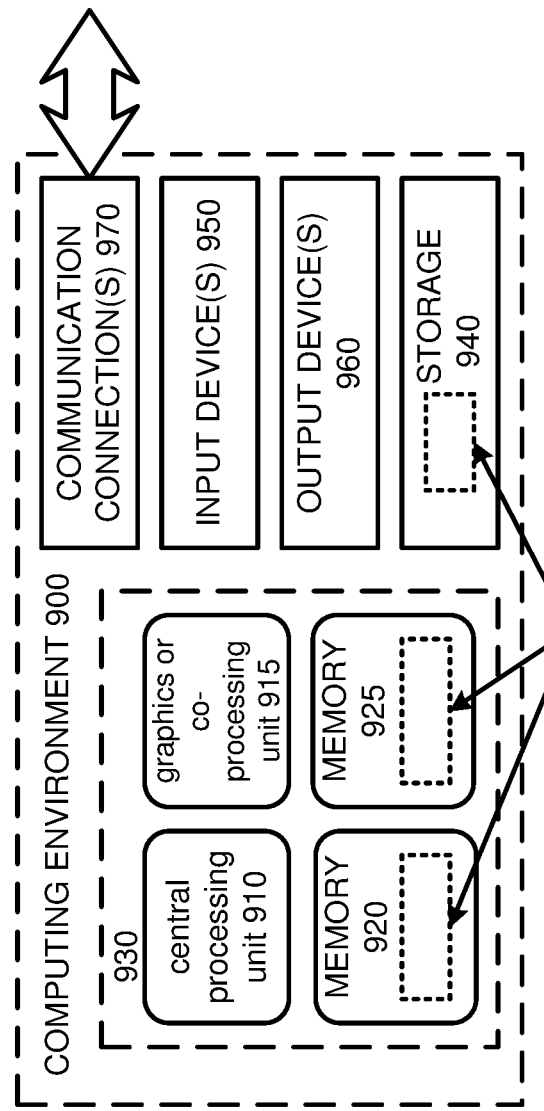
FIG. 9 depicts a generalized example of a suitable computing environment in which certain described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed examples can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed examples, alone and in various combinations and subcombinations with one another. The disclosed methods, apparatus, and systems are not limited to any specific aspect or feature or combination thereof, nor do the disclosed examples require that any one or more specific advantages be present or problems be solved.

In view of the many possible examples to which the principles of the disclosed technology may be applied, it should be recognized that the illustrated examples are only preferred examples and should not be taken as limiting the scope of the claims. Rather, the scope of the claimed subject matter is defined by the following claims. We therefore claim as our invention all that comes within the scope of these claims.

What is claimed is:

1. A method comprising:
responsive to receiving a request to erase application data from a reconfigurable hardware platform:
identifying a previously-programmed logic partition in a reconfigurable logic device of the reconfigurable hardware platform;
storing new values in memory or storage elements of the identified logic partition;
identifying additional resources of the reconfigurable hardware platform associated with the identified logic partition; and
storing new values in memory or storage elements of the identified additional resources.

2. The method of claim 1, wherein the storing new values in memory or storage elements of the identified logic partition comprises clearing logic in the reconfigurable logic device through a configuration port of the reconfigurable logic device to change values in the memory or storage elements.

3. The method of claim 1, wherein the request is generated when terminating a virtual machine instance on the reconfigurable hardware platform.

4. The method of claim 1, wherein the request is received from a supervisor process executing on a host computer coupled to the reconfigurable hardware platform.

5. The method of claim 1, wherein the reconfigurable logic device comprises a host partition controlled by a supervisor process executing on a host computer, and
wherein storing new values in memory or storage elements of the identified logic partition comprises operating a circuit within the host partition to scrub values stored in memory or storage elements of the identified logic partition.

6. The method of claim 1, further comprising:
reconfiguring logic of the identified logic partition to comprise a scrubber circuit,
wherein the scrubber circuit performs the storing new values in memory or storage elements of the identified logic partition or the storing new values in memory or storage elements of the identified additional resources.

7. The method of claim 1, wherein the identified logic partition comprises a scrubber circuit coupled to the additional resources, and wherein the method further comprises operating the scrubber circuit to perform the storing new values in memory or storage elements of the identified additional resources.

8. The method of claim 1, wherein the storing new values in memory or storage elements of the partition comprises storing a known pattern values in the memory or storage elements, the known pattern of values including: all zero values; all one values; all of a predetermined set of one or more values; or random values.

9. The method of claim 1, wherein the reconfigurable logic device comprises a plurality of other logic partitions, the method further comprising:
continuing operation of circuitry in the plurality of other logic partitions while performing the storing new values in memory or storage elements of the identified logic partition.

10. The method of claim 1, wherein the additional resources include at least one of the following devices coupled to an integrated circuit comprising the reconfigurable logic device:
a synchronous dynamic random access memory device (DRAM);
a hybrid memory cube (HMC);
a co-processor;
a network interface comprising network address information; or
a pseudorandom number generator.

11. The method of claim 1, further comprising:
receiving a clearing bitstream from a logic repository database via a host computer coupled to the reconfigurable hardware platform,
wherein the storing new values in memory or storage elements of the identified partition comprises applying the clearing bitstream to an internal or external configuration port of the reconfigurable logic device.

12. The method of claim 1, further comprising:
receiving, from a host computer coupled to the reconfigurable logic device, a description of application logic to be programmed into the identified logic partition;
generating configuration data comprising the application logic and an internal configuration circuit; and
programming the reconfigurable logic device with the configuration data to implement a circuit for the application logic and the internal configuration circuit,
wherein the internal configuration circuit is configured to perform the storing new values in memory or storage elements of the identified portion or storing new values in memory or storage elements of the additional resources.

13. The method of claim 1, further comprising:
launching a virtual machine instance coupled to the identified logic partition of the reconfigurable logic device and the identified additional resources;
with the identified logic partition, performing operations specified in instructions received from the virtual machine instance via a computer network; and
terminating the virtual machine instance,
wherein the storing new values in memory or storage elements of the identified portion and storing new values in memory or storage elements of the identified additional resources is performed in response to terminating the virtual machine instance.

14. The method of claim 1, further comprising:
launching a first virtual machine instance coupled to the identified logic partition of the reconfigurable logic device and the identified additional resources;
terminating the first virtual machine instance; and
launching a second virtual machine instance,
wherein the second launching comprises erasing the identified logic partition by delaying the storing of new values in memory or storage elements of the identified logic portion and the storing of new values in memory or storage elements of the additional resources until the second launching is initiated.

* * * * *